(12) United States Patent
Thaler

(10) Patent No.: US 7,454,388 B2
(45) Date of Patent: Nov. 18, 2008

(54) DEVICE FOR THE AUTONOMOUS BOOTSTRAPPING OF USEFUL INFORMATION

(76) Inventor: Stephen L. Thaler, 12906 Autumn View Dr., St. Louis, MO (US) 63146

( * ) Notice: Subject to any disclaimer, the term of this patent is extended or adjusted under 35 U.S.C. 154(b) by 382 days.

(21) Appl. No.: 11/429,803

(22) Filed: May 8, 2006

(65) Prior Publication Data
US 2007/0011119 A1     Jan. 11, 2007

Related U.S. Application Data

(60) Provisional application No. 60/678,856, filed on May 7, 2005.

(51) Int. Cl.
   *G06N 5/00* (2006.01)
(52) U.S. Cl. .......................... 706/25; 706/45
(58) Field of Classification Search ............. 706/25, 706/45, 47
   See application file for complete search history.

(56) References Cited

U.S. PATENT DOCUMENTS

| | | | |
|---|---|---|---|
| 5,640,494 | A | 6/1997 | Jabri et al. |
| 5,659,666 | A | 8/1997 | Thaler |
| 5,692,107 | A | 11/1997 | Simoudis et al. |
| 5,845,271 | A | 12/1998 | Thaler |
| 5,852,815 | A | 12/1998 | Thaler |
| 5,852,816 | A | 12/1998 | Thaler |
| 6,014,653 | A | 1/2000 | Thaler |
| 6,018,727 | A | 1/2000 | Thaler |
| 6,115,701 | A | 9/2000 | Thaler |
| 6,169,981 | B1 * | 1/2001 | Werbos ............... 706/23 |
| 6,356,884 | B1 | 3/2002 | Thaler |

FOREIGN PATENT DOCUMENTS

WO    02/063555    8/2002

OTHER PUBLICATIONS

Stefan, P., Combined use of Reinforcement Learning and Simulated Annealing: Algorithms and Applications, Ph.D. Thesis, University of Miskolc, Dept. of Mechanical Engineering, 2003, pp. 1-119.*
Thathachar, M., et al., Global Boltzmann Perceptron Network for On-line Learning of Conditional Distributions, IEEE Transactions on Neural Networks, vol. 10, No. 5, Sep. 1999, pp. 1090-1098.*

(Continued)

*Primary Examiner*—Wilbert L Starks, Jr.
(74) *Attorney, Agent, or Firm*—H. Frederick Rusche; Husch Blackwell Sanders LLP

(57) ABSTRACT

A discovery system employing a neural network, training within this system, that is stimulated to generate novel output patterns through various forms of perturbation applied to it, a critic neural network likewise capable of training in situ within this system, that learns to associate such novel patterns with their utility or value while triggering reinforcement learning of the more useful or valuable of these patterns within the former net. The device is capable of bootstrapping itself to progressively higher levels of adaptive or creative competence, starting from no learning whatsoever, through cumulative cycles of experimentation and learning. Optional feedback mechanisms between the latter and former self-learning artificial neural networks are used to accelerate the convergence of this system toward useful concepts or plans of action.

54 Claims, 23 Drawing Sheets

OTHER PUBLICATIONS

Rubtsov, D. V. et al., "XML Based Format For Trained Neural Network Definition", Academic Open Internet Journal, vol. 4, 2001, pp. 1-7.

Marrone, P., "The Complete Guide—All You Need to Know About Joone", Feb. 2005, pp. 1-137.

Mayer, Helmut A., A Modular Neurocontroller for Creative Mobile Autonomous Robots Learning by Temporal Difference, Department of Scientific Computing, University of Salzburg, A-5020 Salzburg, Austria.

Thaler, S., "The Emerging Intelligence and Its Critical Look at Us", Journal of Near-Death Studies, vol. 17, No. 1, 1998, pp. 21-29.

Thaler, S., "A Quantitative Model of Seminal Cognition: The Creativity Machine Paradigm", XP002445582, 1997, p. 1-3.

Thaler, S., "Self-Training Artificial Neural Networks: Nets, Spreadsheets, and Objects", PC AI, vol. 10, 1996, pp. 32-34.

Thaler, S., "Predicting ultra-hard binary compounds via cascaded auto- and hetero-associative neural networks", Journal of Alloys and Compounds, vol. 279, No. 1, 1998, pp. 47-59.

PCT International Search Report for PCT/US2006/017731.

Tan, Ah-Hwee, "Learning user profiles for personalized information dissemination", IEEE, vol. 1, 1998, pp. 183-188.

PHYSTA Report 2.4: "Generation of subsymbolic representations in the emotion understanding problem", XP002442963, 2000, pp. 1-57.

Cogan, B., "The power of neural networks", Scientific Computing World, XP002449470, 2003, pp. 1-2.

Press Release, "NeuroIntelligence 2.2 Released", Alyuda Research Company, XP002449471, 2005, p. 1.

PCT International Search Report for PCT/US2006/028591.

* cited by examiner

DEVICE FOR THE AUTONOMOUS BOOTSTRAPPING OF USEFUL INFORMATION

CROSS-REFERENCE TO RELATED APPLICATIONS

This application claims the priority of provisional application Ser. No. 60/678,856, filed May 7, 2005.

TECHNICAL FIELD OF THE INVENTION

This invention relates generally to the field of artificial intelligence and, more particularly, to a self-learning, neural network-based discovery system.

BACKGROUND OF THE INVENTION

The following is a summary of an improvement over my prior patents beginning with U.S. Pat. No. 5,659,666, Device for the Autonomous Generation of Useful Information, and its derivative patents: U.S. Pat. Nos. 5,845,271, 5,852,815, 5,852,816, 6,014,653, 6,018,727, 6,115,701, 6,356,884, all of which are incorporated herein by reference. Whereas these original patents utilized pre-trained artificial neural networks in the tandem arrangement shown in FIG. 1, with one network perturbed to generate novel and potentially useful patterns (i.e., ideas or plans of action), while another net served as a critic (with optional feedback to the perturbed net), this fundamental architecture did not possess the ability to learn from its own successes and failures.

Therefore, it would be advantageous to develop an artificial neural network-based system capable of learning from its own successes and failures.

The present invention is directed to overcoming one or more of the problems set forth above.

SUMMARY OF THE INVENTION

One aspect of the invention generally pertains to a neural-network based system capable of bootstrapping itself to progressively higher levels of adaptability and creativity upon the introduction of the system to a specific application domain wherein it engages in successive cycles of experimentation and learning from the results of such experimentation.

In accordance with the above aspects of the invention, there is provided a self-learning, artificial neural network based-discovery device that includes a first artificial neural network portion capable of producing output patterns; means for subjecting said first artificial neural network to varying degrees of perturbation; means for implementing at least one of said output patterns of said first self-learning artificial neural network as a concept; means of evaluating an effect of said concept; and means of triggering reinforcement learning within said first self-training artificial neural network of one of said output patterns leading to a positive effect. Essentially this system mimics the process in the brain wherein ideas are first generated and subsequently reabsorbed as memories. Through cumulative cycles, new ideas are built upon prior ideas, which in turn become memories upon which even more advanced ideas may be based.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made to the drawings which illustrate the best known mode of carrying out the invention and wherein the same reference numerals indicate the same or similar parts throughout the several views.

DETAILED DESCRIPTION

Figure 1:
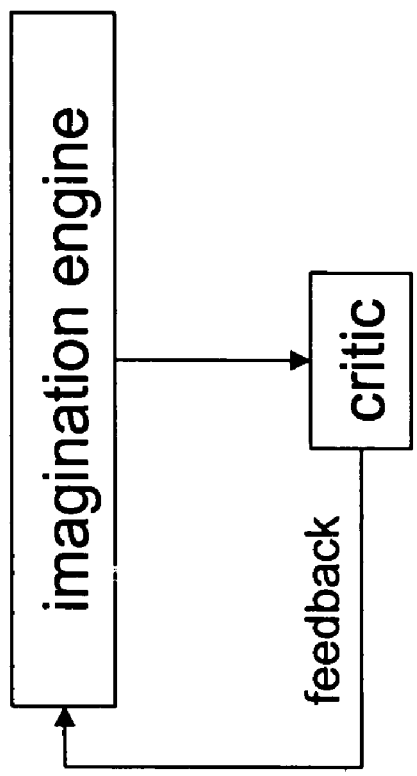
FIG. 1 is a diagram of a previous generation Creativity machine.

In the following detailed description, numerous specific details are set forth in order to provide a thorough understanding of the invention. However, it will be understood by those skilled in the art that the present invention may be practiced without these specific details. For example, well-known methods, procedures, and components have not been described in detail so as not to obscure the present invention.

The creative neural architectures, sometimes referred to herein as Creativity Machines, described herein make use of object-oriented neural network modules each of which contains its own dedicated training algorithm (STANNOS).

STANNOS are also described in U.S. Pat. No. 6,014,653, the disclosure of which is expressly incorporated by reference herein. A description of earlier versions of Creativity Machines and the general structure utilized in Creativity Machines is contained in U.S. Pat. No. 5,659,666, Device for the Autonomous Generation of Useful Information, and its derivative patents: U.S. Pat. Nos. 5,845,271; 5,852,815; 5,852,816; 6,014,653; 6,018,727; 6,115,701; and 6,356,884, all of which are expressly incorporated herein by reference. These earlier patents utilized pre-trained artificial neural networks in the tandem arrangement shown in FIG. 1. The fundamental architecture associated with these systems included one network perturbed to generate novel and potentially useful patterns (i.e., ideas or plans of action), while another net served as a critic (with optional feedback to the perturbed net).

In the currently described embodiments, when such a Creativity Machine generates a number of candidate ideas or strategies, humans may assess the validity of these ideas and train the respective networks on these patterns in situ, within the architecture. The perturbed, generative network may subsequently train upon the new idea or strategy so as to reinforce the memory of this novel pattern.

Embodiments of the system described herein generally consist of two types of artificial neural networks, auto- and hetero-associative, multilayer perceptrons intercommunicating with one another. For each of these types of neural networks, the notion of reinforcement learning has a slightly different meaning.

The auto-associative network has the same number of input and output units. Reinforcement learning involves at least one cycle of propagating an input pattern through this network, while using that same pattern as the target output pattern for the backpropagation step. Over sufficient feed forward and backpropagation cycles, the network learns to replicate this, as well as other similarly reinforced patterns, at its output layer. Later, the assessment as to whether an arbitrary input pattern is one of such memories depends upon its reconstruction error through the network, typically determined by the Euclidean distance between the input and output patterns. Similarly, a memory can be reconstructed through the application of some stochastically generated seed pattern at the input layer, followed by multiple recursions between the output and input layer, so that the input and output patterns converge toward one another. Any such resulting pattern that remains stable throughout this recurrence is then said to constitute a memory of this auto-associative network.

The hetero-associative network is one mapping one vector space to another, typically resulting in a neural network having different numbers of input and output units. In the context of reinforcement learning, the objective is not to absorb a memory into the network, but to impress some typically non-trivial input-output relationship across it.

For both auto- and hetero-associative networks, such reinforcement learning takes place in situ within a compound neural architecture. Therefore, rather than remove the individual auto- and hetero-associative networks from such a system and train each off line, training takes place in line within the cascade. In the self-learning systems described herein, each component neural network, a so-called "Self-Training Artificial Neural Network Object" (STANNO), has its own dedicated training algorithm integrated with it.

The C++ class template for such objects initially consist of an untrained neural network, along with a dedicated training algorithm, all intermingled within a class wrapper. To initialize an object from its class, the network architecture is specified through some integer array that specifies the number of neurons in its successive layers, int nodes[ ]={100, 200, 100};

and the class constructor is called,

CStanno*pStanno=new CStanno();

Subsequently, the network is initialized through the instruction pStanno->Initialize(3, nodes);

where 3 indicates that this is to be a three layer multilayer perceptron.

One cycle of reinforcement learning within such a self-training network would be achieved in a combined feed forward and backpropagation step, pStanno->Train(TRUE, dInPattern, dOutPattern, dNetOutPattern);

where the TRUE boolean flag indicates that training is taking place (in contrast to non-adaptive feed forward passage), dInPattern is a double array containing the training input pattern, dOutPattern is a double array representing the target output pattern, and dNetOutPattern is a similar double array meant to receive the actual output pattern of the net.

For an auto-associative STANNO, one cycle of reinforcement learning would take the form of the instruction pStanno->Train(TRUE, dInPattern, dInPattern, dNetOutPattern);

where we have used dInPattern not only as the training input pattern, but also as the target training output pattern.

To thoroughly absorb a training pattern as a memory, several cycles of training would need to take place.

```
double dRMS = 1;
while (dRMS > 0.01)
{
    dRMS = pStanno->Train(TRUE, dInPattern, dInPattern,
        dNetOutPattern);
}
```

Note that the Train method of the STANNO class returns the double root-mean-square (RMS) training error for any backpropagation cycle.

The critic network may likewise include such an ideational pattern as an input training exemplar and the measured properties, measured impact, or the perception (i.e., subjective opinions) of that input pattern may serve as the output training exemplar of the typically hetero-associative network. If this Creativity Machine drives a control system or a robot, then both networks may learn from their successes and failures in real time.

Figure 2:
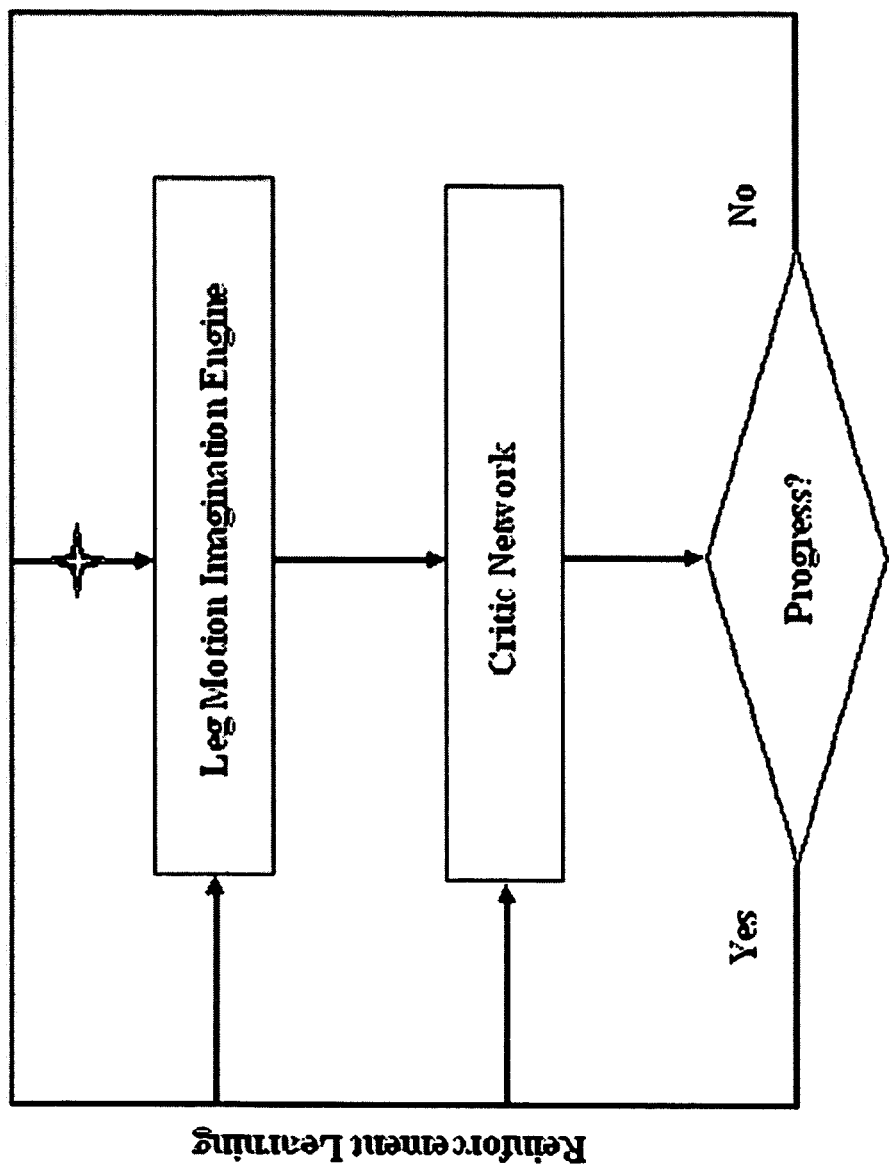
FIG. 2 is a flow chart of the learning process associated with an application of a first embodiment of the present invention.
Figure 3:
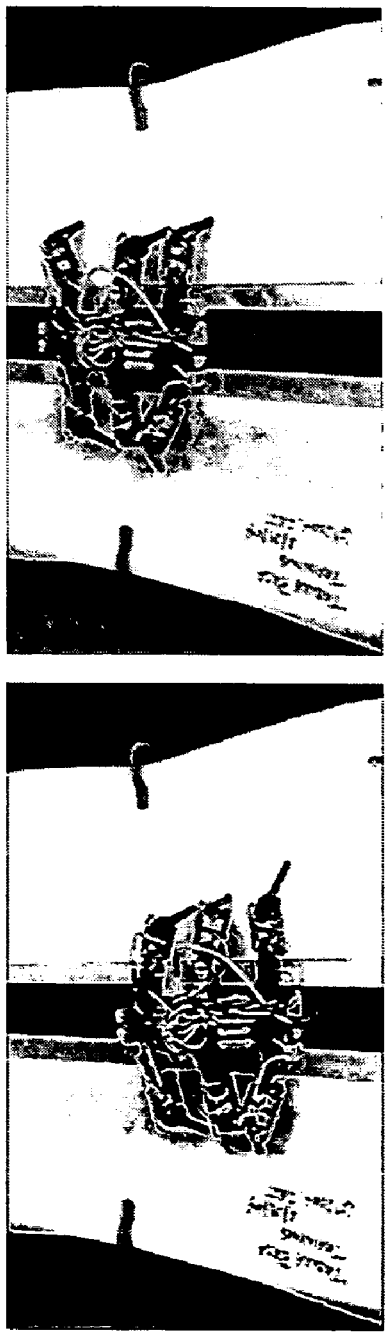
FIG. 3 is a depiction of the learning process of a robot employing the embodiment of FIG. 2.

For example, if the perturbed network illustrated in FIG. 1 is generating servo settings for a hexapod robot, there the perturbed net is called the "Leg Motion Imagination Engine", which begins in an initialized state characterized by random connection weights. The Imagination Engine and critic network launch into an experimental cycle in which noise is injected into the Imagination Engine so as to create a pattern of servo settings for a virtual robot, see FIG. 2. If forward motion is detected by onboard sensors (i.e., sonar), which are virtual in this case, the servo pattern is learned by the Imagination Engine that takes the form of an auto-associative network. Likewise, the critic network trains, using the servo pattern as an input pattern and the forward translation of the robot is used as the training output. In this way, reinforcement learning takes place upon successful servo movements and the hexapod robot cumulatively learns to walk on its own. This same process is shown in FIG. 3 where a sonar-equipped robot is learning to walk in one dimension. On the left, the hexapod robot is just learning to walk on a surface sprayed with adhesive. After just four minutes, the robot begins to develop its own self-discovered and self-refined forward gait. Both left and right frames compare progress of the robot after a two second crawling interval.

Figure 4:
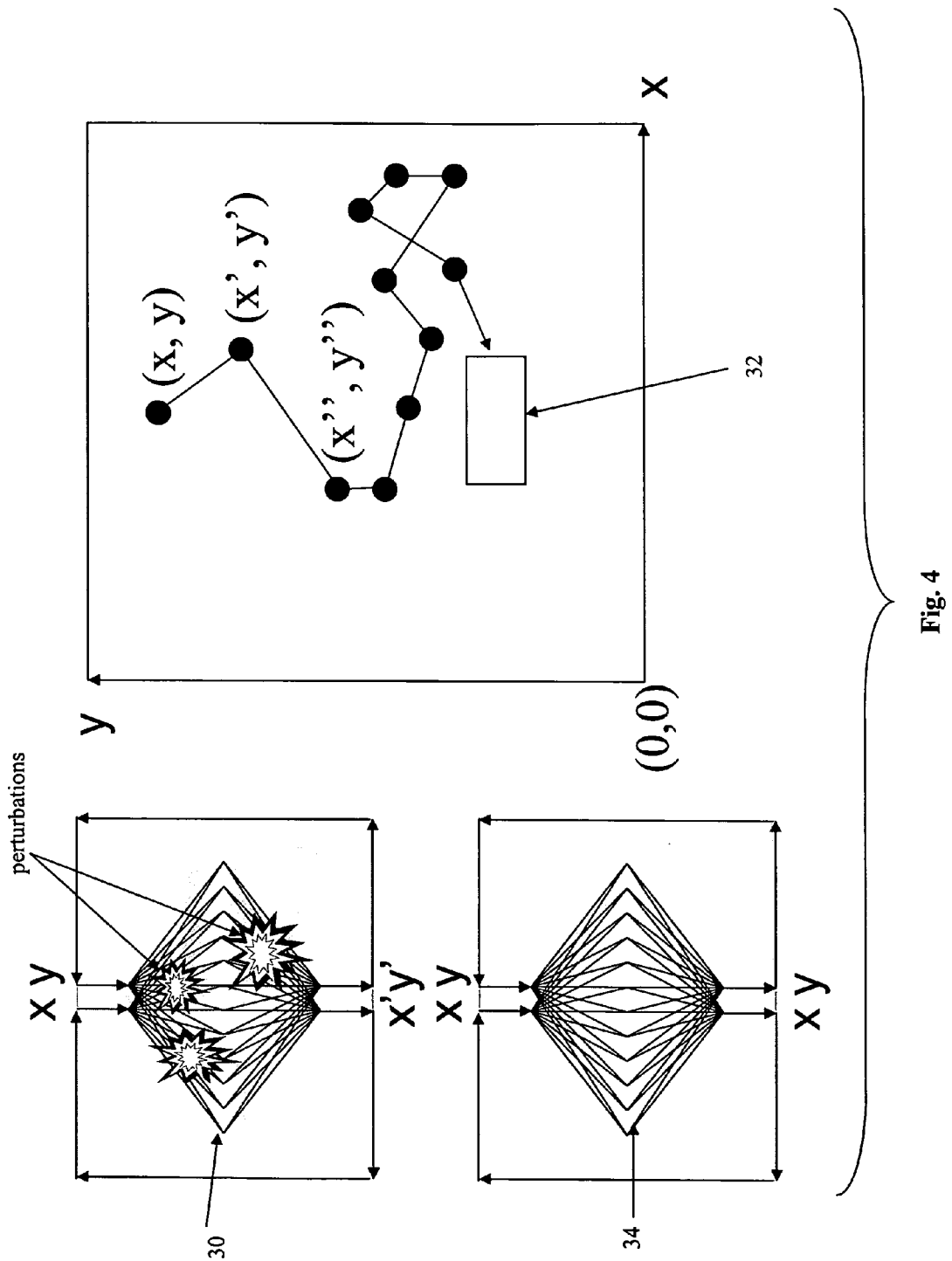
FIG. 4 is a diagrammatic view of the learning process associated with an application of another embodiment.
Figure 5:
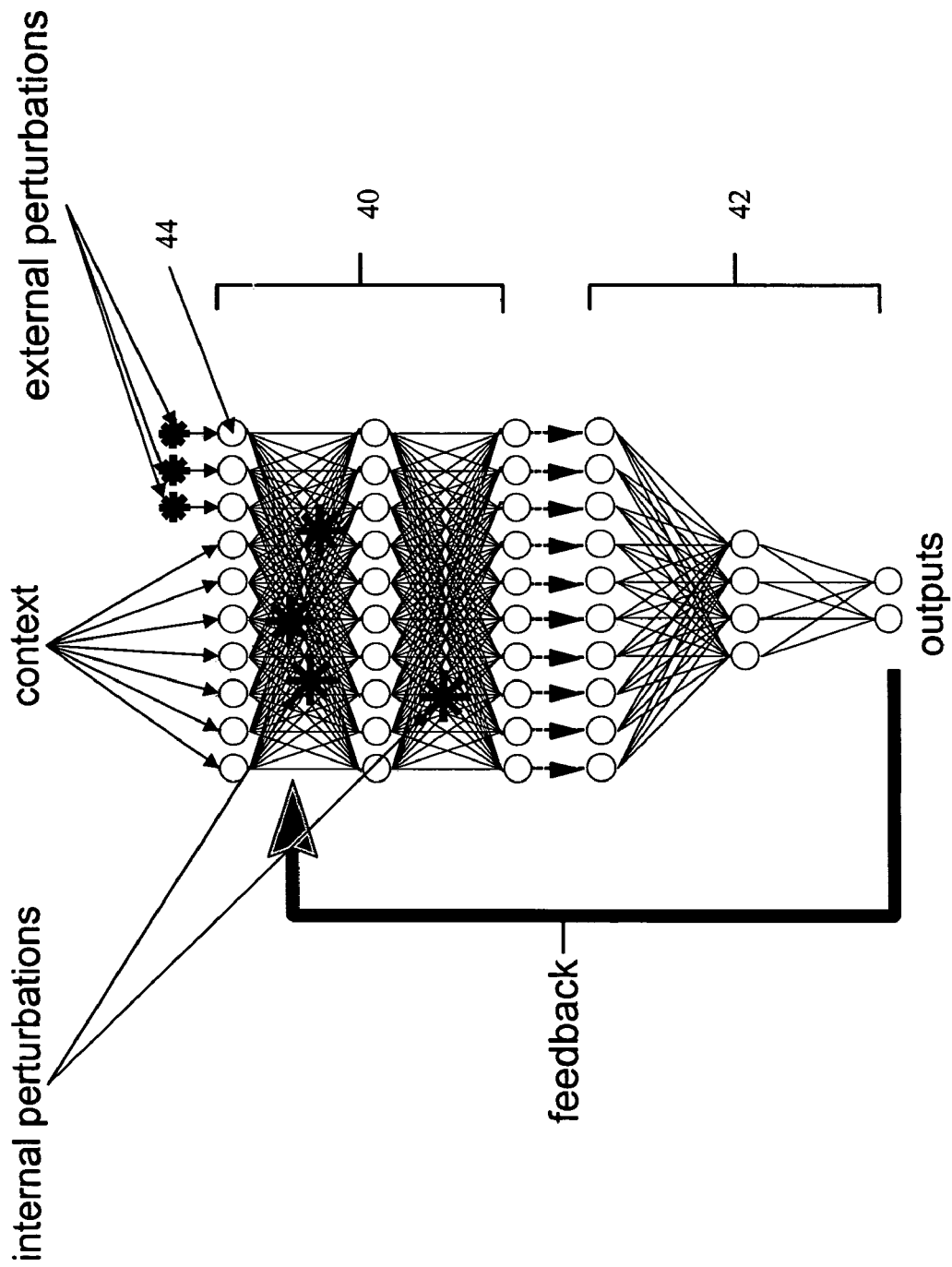
FIG. 5 is a diagram of an embodiment of the present invention.
Figure 6:
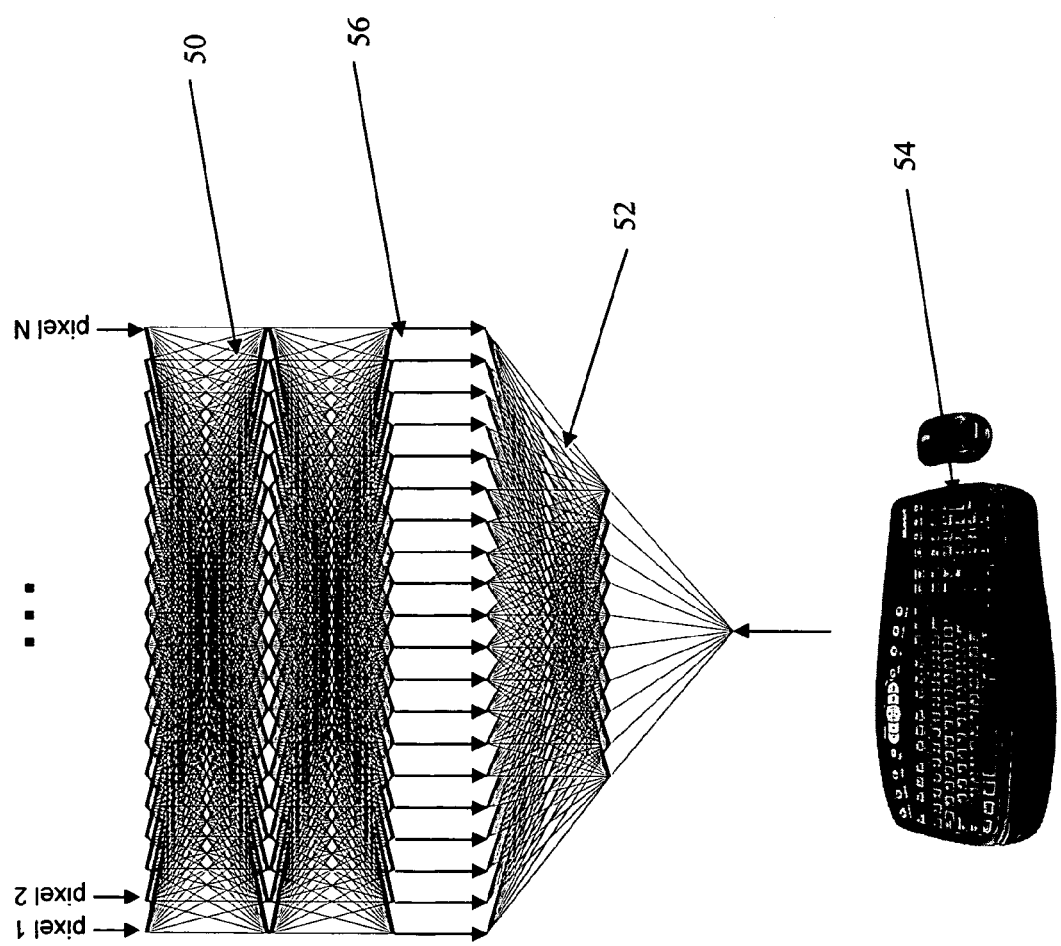
FIGS. 6-10 are diagrams representing the various phases of a facial reconstruction application using another embodiment.
Figure 7:
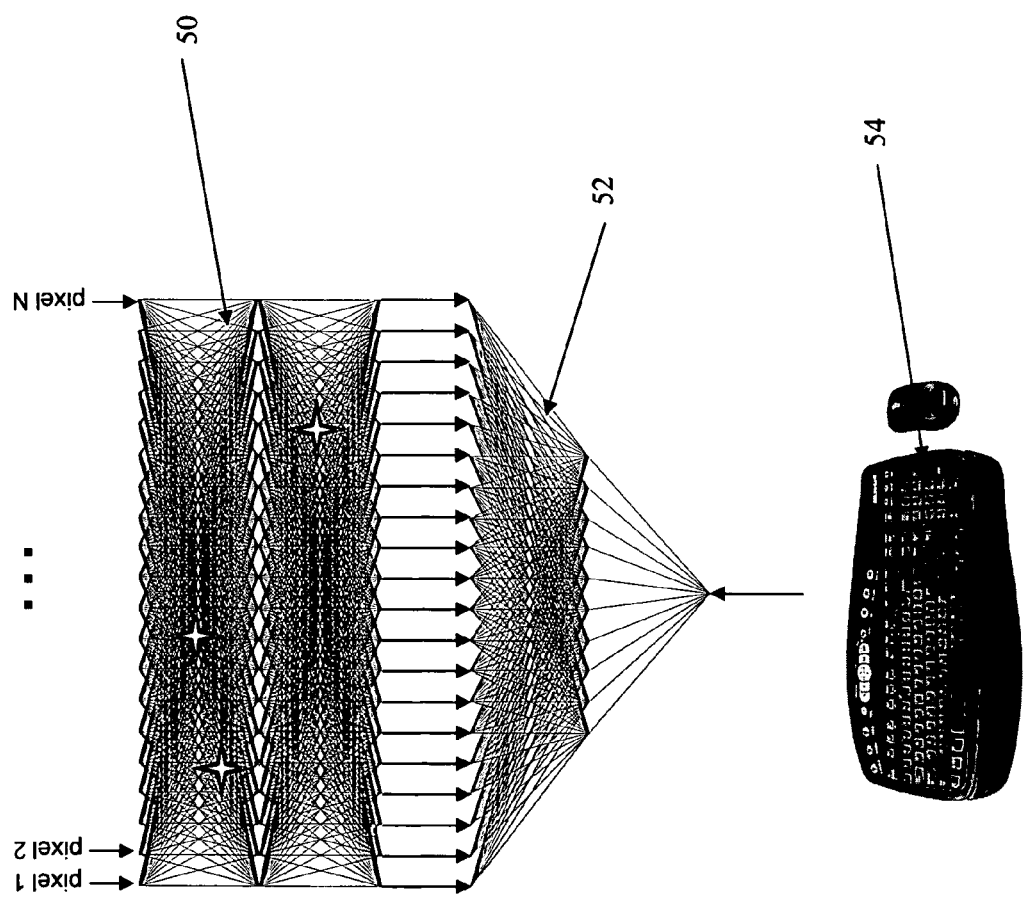
Figure 8:
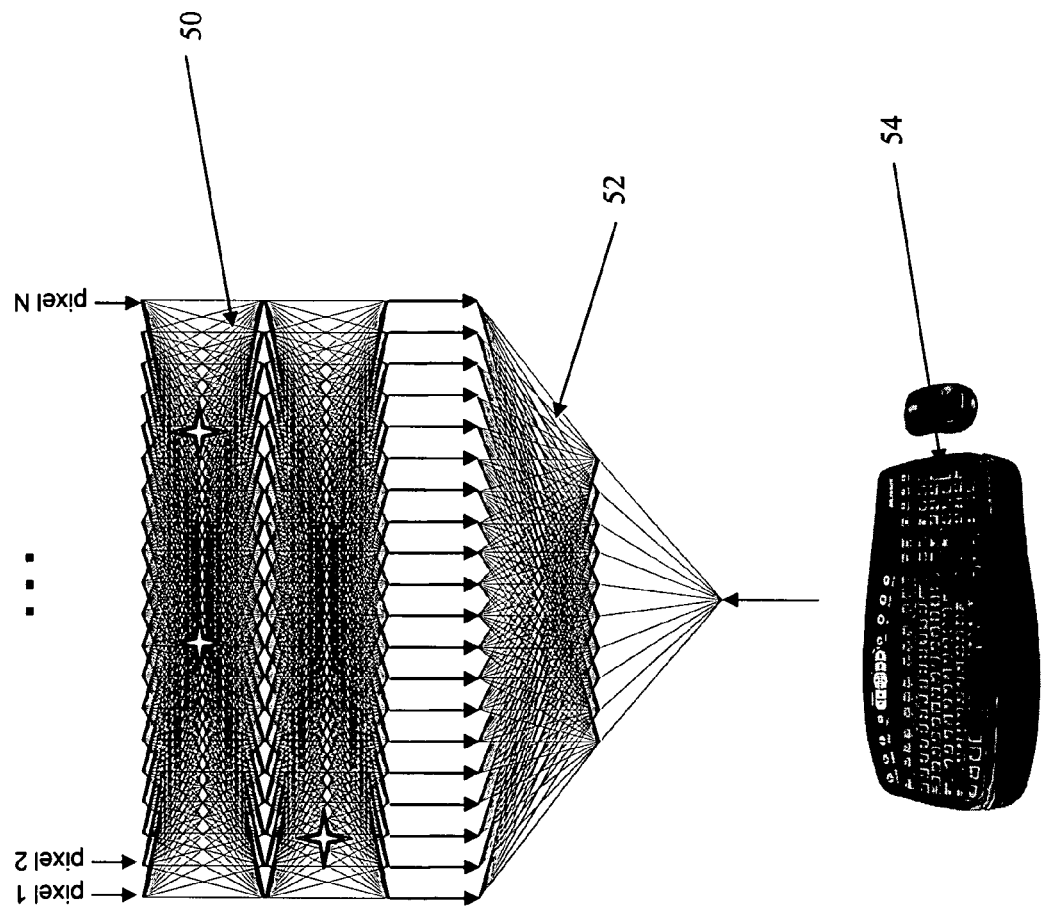
Figure 9:
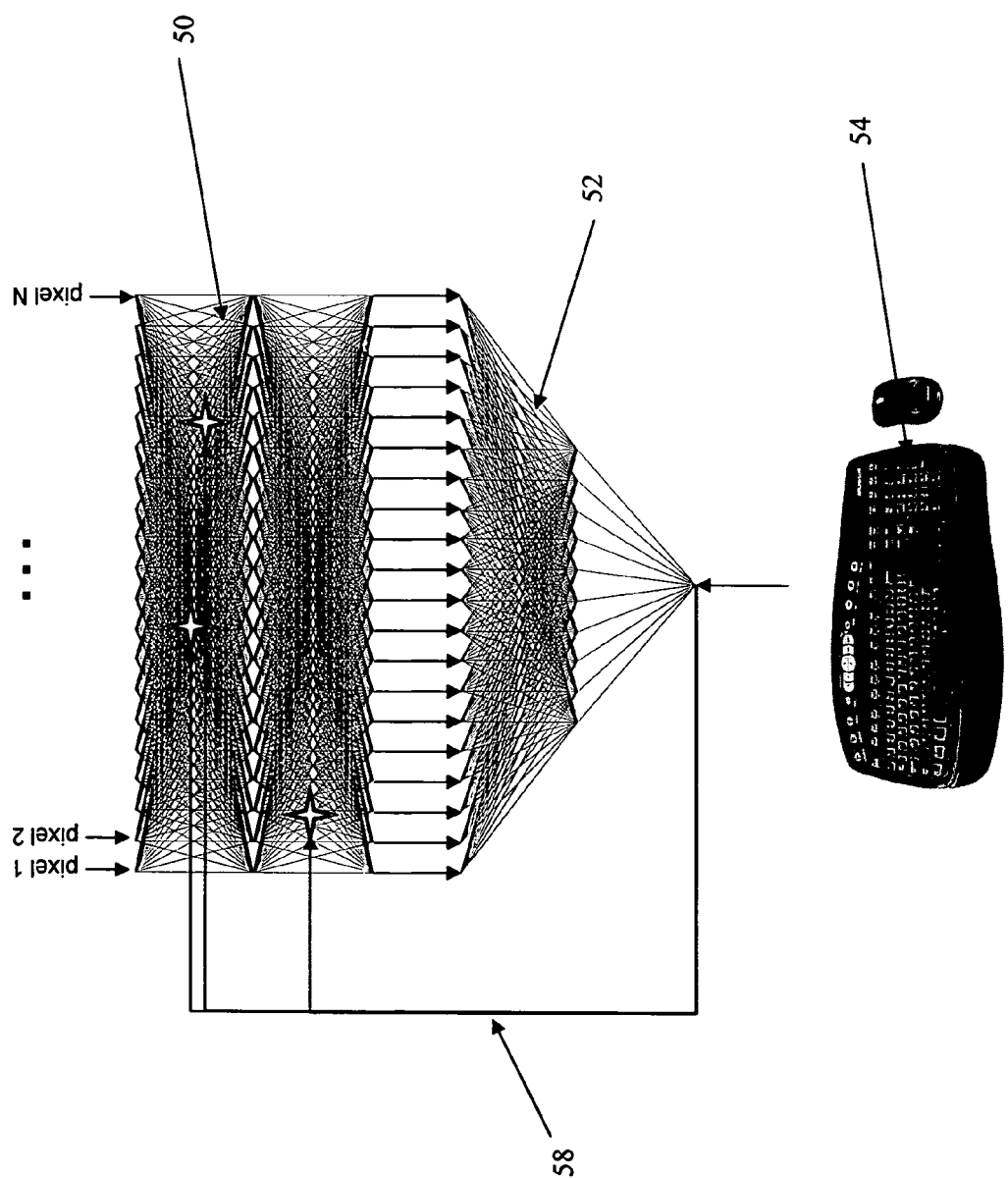
Figure 10:
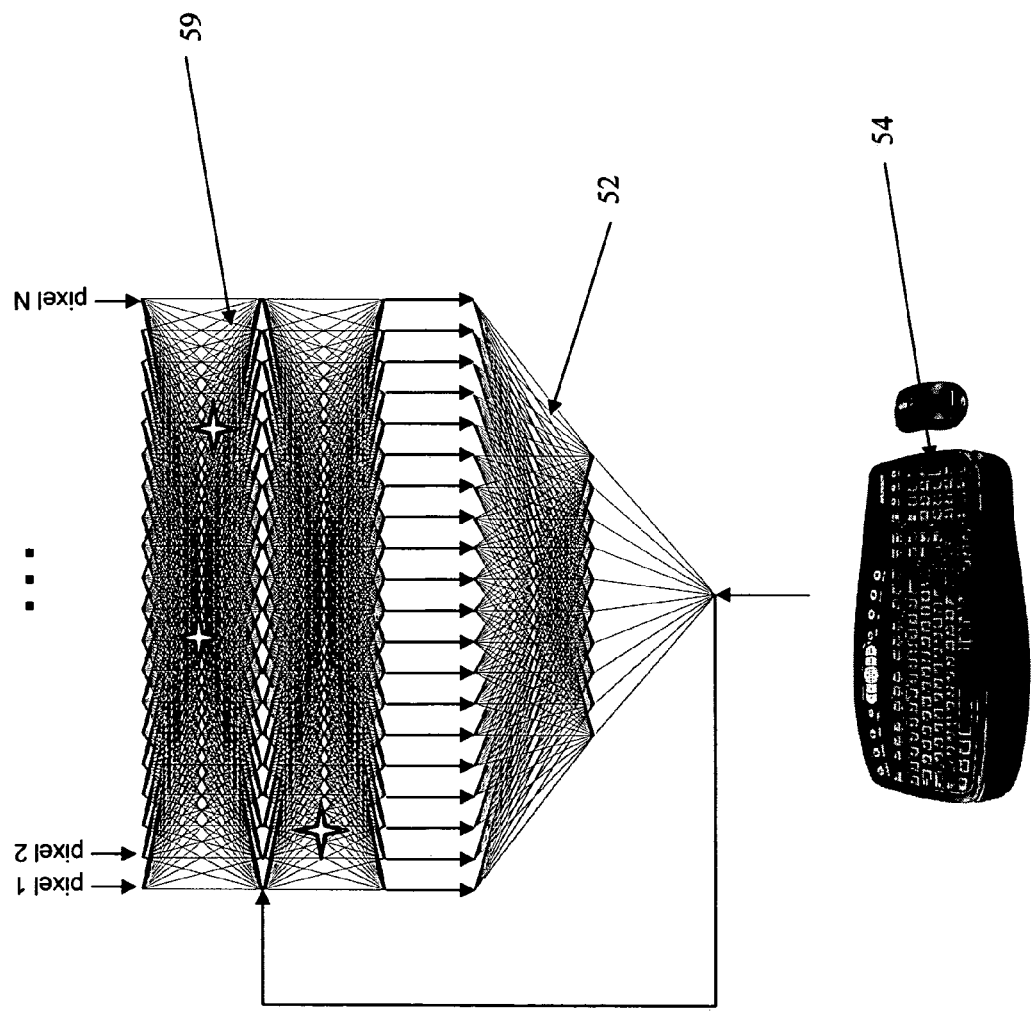

These systems can also be used to make foveational systems self-learning. Such a foveational system, as shown in FIG. 4, consists of an Imagination Engine 30 based upon an auto-associative STANNO that essentially generates a series of x, y coordinates through recursion as perturbations are applied to its synapses. These x, y coordinates serve to position a small attention window 32 throughout a frame provided by a camera. The critic network 34, likewise an auto-associative network is intended to identify objects appearing in the attention window at the Imagination Engine generated position x, y. Its weights may be initially randomized. Typically, to train this ANN system to recognize an object, the object itself is placed against a white background as the Imagination Engine randomly drives the attention window around the camera frame. When a master algorithm detects non-white pixels within the attention window, the Imagination Engine is trained upon those x, y coordinates, and the critic network is trained upon the pattern of pixels within the attention window. The result is that as the ANN system trains, the Imagination Engine tends to generate coordinates in the neighborhood of the intended target (tending less often to visit the white areas), and the critic becomes more adept at identifying pieces of the target appearing in the attention window. Later, the imagination engine can be randomized and the ANN system used to locate objects similar to the target that are arbitrarily placed in the scene.

The systems described herein can also be "detrained." By detraining we mean that the exemplars introduced during a training cycle are deliberately and programmatically corrupted so as to avoid the inherent relationship between input and target output patterns being learned by the network. This can be accomplished by adding stochastic or systematic values to the input or output exemplars, or both.

In detraining an auto-associative network intended as an associative memory or group membership filter, adding random or systematic values to the components of a training pattern spoils the absorption of its corresponding memory, leading to significant reconstruction error when that pattern is later applied to the trained network. Furthermore, the ability of the network to run recurrently so as to settle into a stable memory corresponding to this detraining exemplar is denied.

Yet another feature of the system described herein is the incorporation of a "group membership filter." A group membership filter is defined herein as an auto-associative, multilayer perceptron that has been trained on a body of patterns representing some genre. For instance, such a neural network may be trained on numerous bitmaps of human faces. Thereafter, when one of these facial training exemplars (i.e., the complete enumeration of pixels within the bitmap), or some new facial bitmap is applied to it as an input pattern, the network accurately reconstructs the input pattern at its output layer. In this case, the reconstruction error, $\delta$, represented as the Euclidean distance between input and output patterns of this net, is negligibly small. If on the other hand, some image that is non-representative of this genre, such as the bitmap of a foot, is applied to the input layer of this net, reconstruction error is no longer negligible. Therefore, naming a threshold below which an input pattern is representative of and above which the pattern is non-representative of a genre, allows us to later discriminate arbitrary input patterns as belonging or not to some interrelated group of patterns previously shown to the network in training.

This process works due to the underlying function of an auto-associative multilayer perceptron, wherein feature detection takes place within the hidden layer(s) and constraint relationships between such micro-features form in the output weight layer(s). In the above example, for instance, weights self-organize so as to capture the most frequently encountered micro-features of the net's input space (i.e., eyes, noses, chins, ears, etc.). Likewise, the output weight layer(s) typically absorb the geometric and topological constraints inherent within faces (i.e., nose is at center of face, with mouth below and eyes above and to either side). Therefore, if a facial pattern propagates through the net, all of the essential anatomical features are detected at the hidden layer(s) and all geometric and topological constraints between such features are obeyed in the output layer. In this case, the input pattern is accurately reconstructed, producing negligible reconstruction error. If on the other hand, the image of the foot is propagated through the net, the critical features of a face are not recognized at the hidden layer, nor are the constraints obeyed in the output weight layer(s). As a result, the input pattern is not reconstructed and delta error is significant.

The general principles discussed above are further illustrated in a series of non-limiting exemplary applications utilizing various embodiments of the present invention.

Police Sketch Artist Application

The objective of this software application (illustrated in FIGS. 6-10) is to assist or even replace a police artist with an automated tool to reconstruct the image of a crime victim's assailant(s) through successive cycles of trial and error assessment of candidate faces by that victim. Such a software application would very likely eliminate cross-queuing and subtle influencing between the human artist and the victim.

In operation, the victim views a series of faces randomly generated by a perturbed neural network 50 (i.e., the imagination engine that has previously trained upon a wide range of facial bitmaps) while indicating through some graphical user interface control 54, such as a slider or series of buttons, how much they associate each candidate face generated by the imagination engine with that of the assailant. Meanwhile, a critic net 52 (i.e., the alert associative center) is training in situ within this neural architecture, learning to map trial facial images generated by the imagination engine to the victim's evaluation of them. In the final stage of operation, the imagination engine can rapidly generate a series of faces as the critic predicts the victim's anticipated response to each pattern. Through such rapid pattern generation and evaluation, the imagination engine and critic engage in an uphill climb strategy to identify the face most resembling that of the assailant.

In the first phase (FIG. 6) of this process, a large multilayer auto-associative network 50 is trained upon a variety of bitmaps of exemplary faces, training the net to reproduce each input pattern at its output layer 56. Typically, such networks are large, having on the order of a million inputs and outputs, often incorporating 640×480 displays in 24 bit RGB format. In a commercial version of this application, this network will have already been pre-trained.

In the next phase (FIG. 7) of operation of this application, the imagination engine 50 is randomly perturbed to produce a wide range of faces that are individually displayed to the victim, who then indicates how strongly they feel each exemplary face is to that of the assailant. Cumulatively, the self-learning critic 52 learns to generalize, indicating the degree of match between any image generated by the imagination engine 50 with that of the assailant. It has been found that the best approach for perturbing the imagination engine 50 for this application is via small numerical perturbations applied to the connection weights of the neural network. It is also recommended that training exemplars be randomly applied to the inputs of this network as synaptic perturbations are applied internally. In this way, the output pattern 'skirts' each training exemplar by generating a wide range of plausible variations upon it.

In the final phase (FIG. 8) of this process, the imagination engine 50 is allowed to spontaneously generate a series of faces that are evaluated by the critic 52 to determine how closely each comes to the assailant's. Cumulatively, the application keeps track of those candidate face(s) that are most strongly associated with that of the assailant via the critic 52.

One variation (FIG. 9) on this process that typically speeds convergence toward the assailant's face, involves feedback mechanisms 58 between the critic 52 and the imagination engine 50 to adjust the perturbations within the latter. For instance, if over some pre-designated period, the critic 52 has not 'seen' a candidate facial pattern resembling the assailant's, it can increase the mean level of synaptic perturbation within the imagination engine 50 to achieve more diversity in the resulting facial patterns, hence increasing the likelihood of generating a pattern resembling that of the assailant. Furthermore, the critic (52) may also train in situ, training using facial patterns associated with the assailant(s) and the victim's recognition metric as the output pattern.

An advanced usage (FIG. 10) of this application involves a self-learning imagination engine 59. In this technique, both critic 52 and imagination engine 59 simultaneously train as the victim rates each of the candidate faces produced by the imagination engine 59. The more strongly the victim recognizes the candidate face as that of the assailant, the more rigorously its memory is impressed upon the auto-associative imagination engine 59. The strength of reinforcement can be achieved in several ways. In one technique, the learning rate and momentum of training the imagination engine can be increased in proportion to the critic's association of the candidate's face with that of the assailant. In another approach, the imagination engine 59 is trained upon a given facial pattern a number of cycles that are proportional to the critic's recognition of that pattern. In similar manner, such a system may be used for entertainment purposes, learning cumulatively to generate the most appealing face. Obvious extensions of this concept can be applied to any combination of human sensory channels so as to provide an entertainment experience that tailors itself to its audience.

Over cumulative cycles of generation and training, the dominant memory or memories within the imagination engine 59 are patterns most closely associated with that of the assailant. Such dominant memories may be found by either (1) stochastically seeding the imagination engine 59 and running the net recurrently until it 'falls' into the dominant memory's attractor basin, or (2) applying random patterns (i.e., corrupted facial training exemplars) to this auto-associative net until reconstruction error falls below some predetermined threshold.

Robotic Locomotive Skills via Tabula Rasa Learning

In this application (illustrated in FIGS. 11-14), a self-learning, multilayer, auto-associative neural network is used to selectively capture those pulse width modulation sequences of a 12 degree of freedom hexapod robot that lead to forward motion. The value of any pulse width modulation sequences applied is judged by an onboard sonar unit that effectively measures net translation the robot makes in its forward direction as a result of any given pulse width modulation sequence delivered to its servos. Using this system, the component neural networks can begin totally untrained. Having discovered servo sequences that lead to forward behavior, the weights of this network may be degraded via perturbations to generate important alternative behaviors such as backward, turning, and sidle motions.

The system that allows tabula rasa learning of complex locomotive sequences consists of three components, (1) a self-learning auto-associative network having 48 inputs and outputs that accommodates four successive leg states of the twelve servo robot, (2) an algorithm to compare inputs and outputs of this auto-associative network, and (3) a self-learning hetero-associative network, fed by the auto-associative net that eventually maps the four state servo sequence to the predicted forward translation of the robot.

Figure 11:
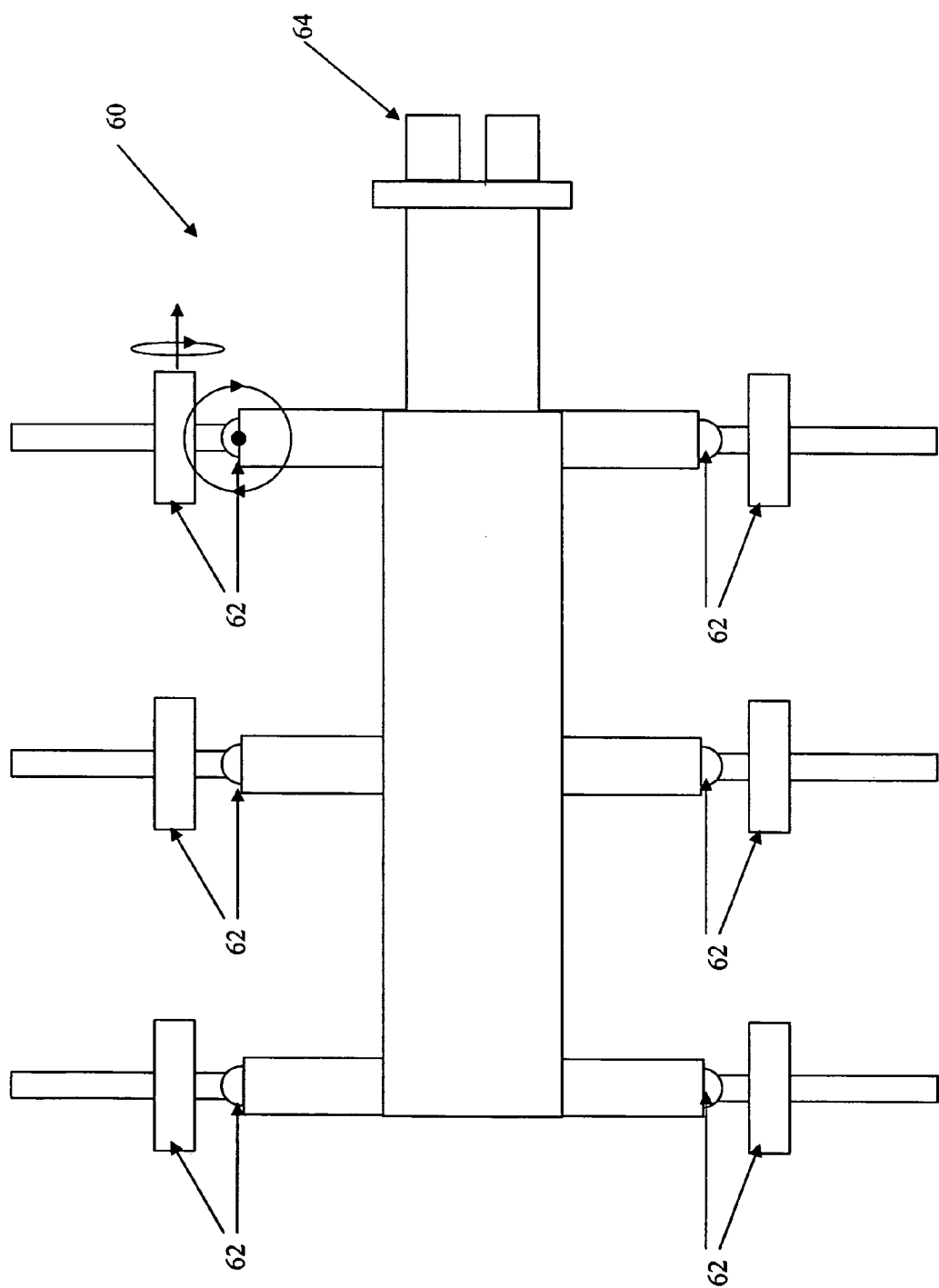
FIG. 11 is a schematic view of a hexapod robot employing an application of another embodiment.
Figure 12:
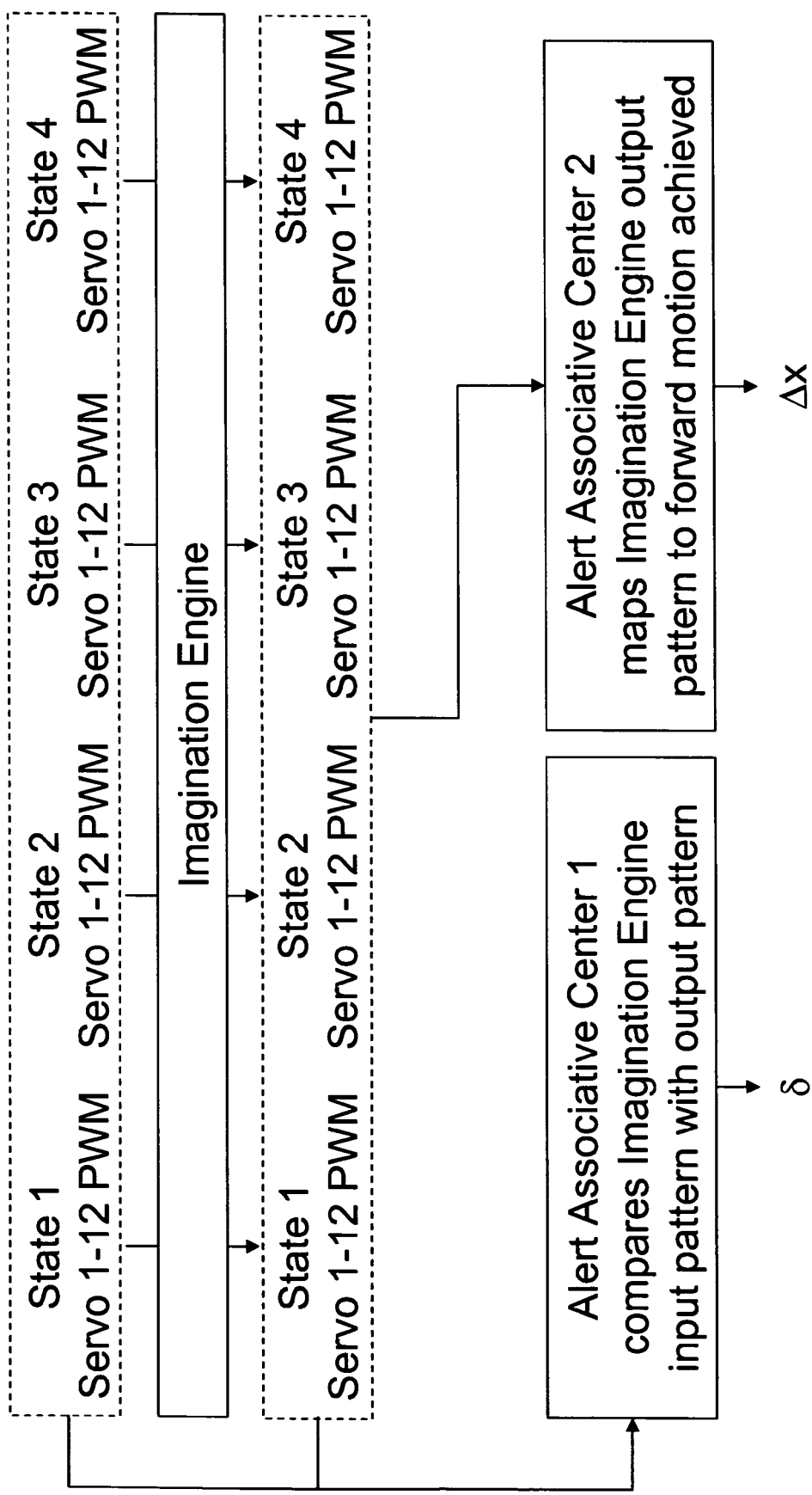
FIG. 12 is a diagrammatic view of a first application of an artificial neural network-based control system for the hexapod robot of FIG. 11.
Figure 13:
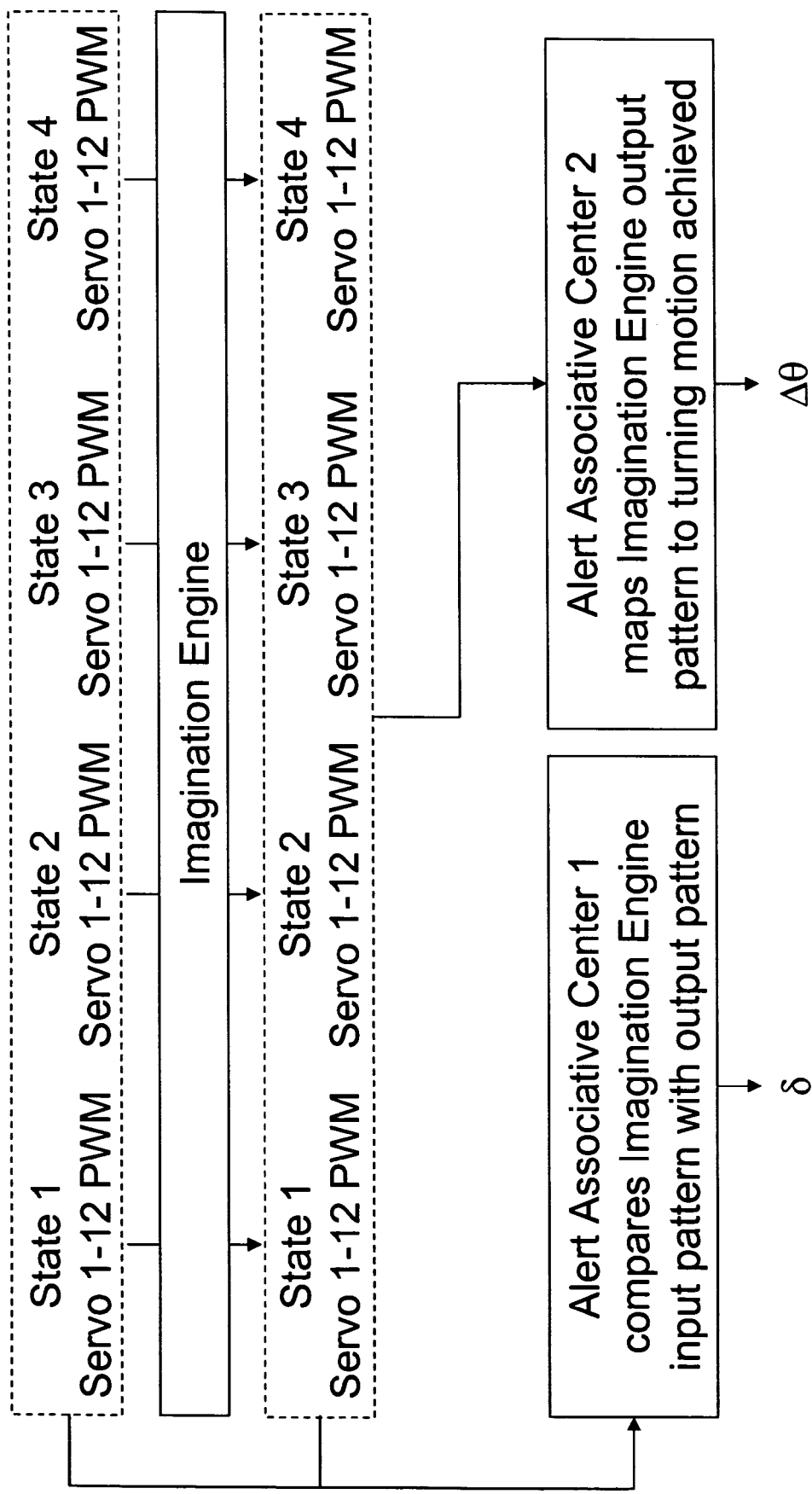
FIG. 13 is a diagrammatic view of another application of an artificial neural network-based control system for the hexapod robot of FIG. 11.
Figure 14:
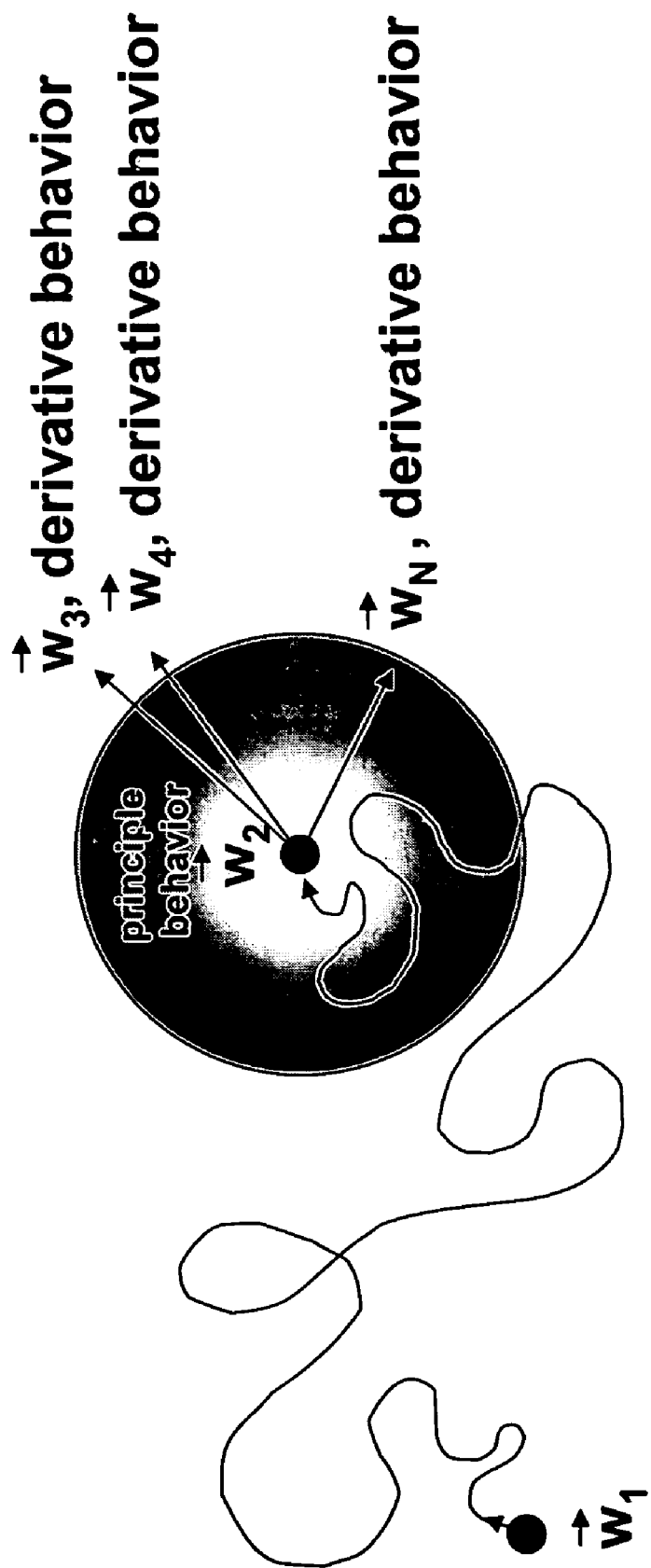
FIG. 14 is a depiction of potential derivative behaviors resulting from the application of FIG. 13.

A simplified diagram of a hexapod robot 60 is shown in FIG. 11, depicting the layout of servos 62 in the robot's legs, as well as an onboard sonar unit 64 for calculating distance to a remote target, and from that the net distance traversed over any four-state servo sequence.

In learning (see FIG. 12), random pulse width modulations are applied to the servos 62 over four successive states. If the sonar 64 detects forward motion in excess of some threshold value as a result of this trial sequence, the memory of the sequence is reinforced within the auto-associative imagination engine. Similarly, reinforcement learning takes place in the alert associative center, using the four-state servo sequence as the training input pattern and the distance traversed, $\Delta x$, the output training pattern. After sufficient cycles of experimentation and reinforcement learning in the two networks, leg motions emerge that yield efficient forward motion.

Once trained in this way, we may later operate the robot in this newly invented locomotive mode. To do so, either (1) random or semi-random numbers may be applied to the imagination engine until the reconstruction error, $\delta$, is minimized, as evaluated by alert associative center 1, or (2) the network may be run recurrently until reconstruction error, $\delta$, is minimized. If the alert associative center confirms that the servo sequence will result in forward motion, the corresponding pulse width modulations are conveyed to the leg servo system.

Other important behaviors of the robot, such as left and right turning, as well as sidle, shuffling, or backward motion can be readily achieved by applying perturbations to the imagination engine's connection weights and now monitoring via other sensors, such as accelerometers and a digital compass, the magnitude of sidle motion or the magnitudes of turns. As suitable turns occur, for instance, reinforcement learning may take place in both networks.

Figure 15:
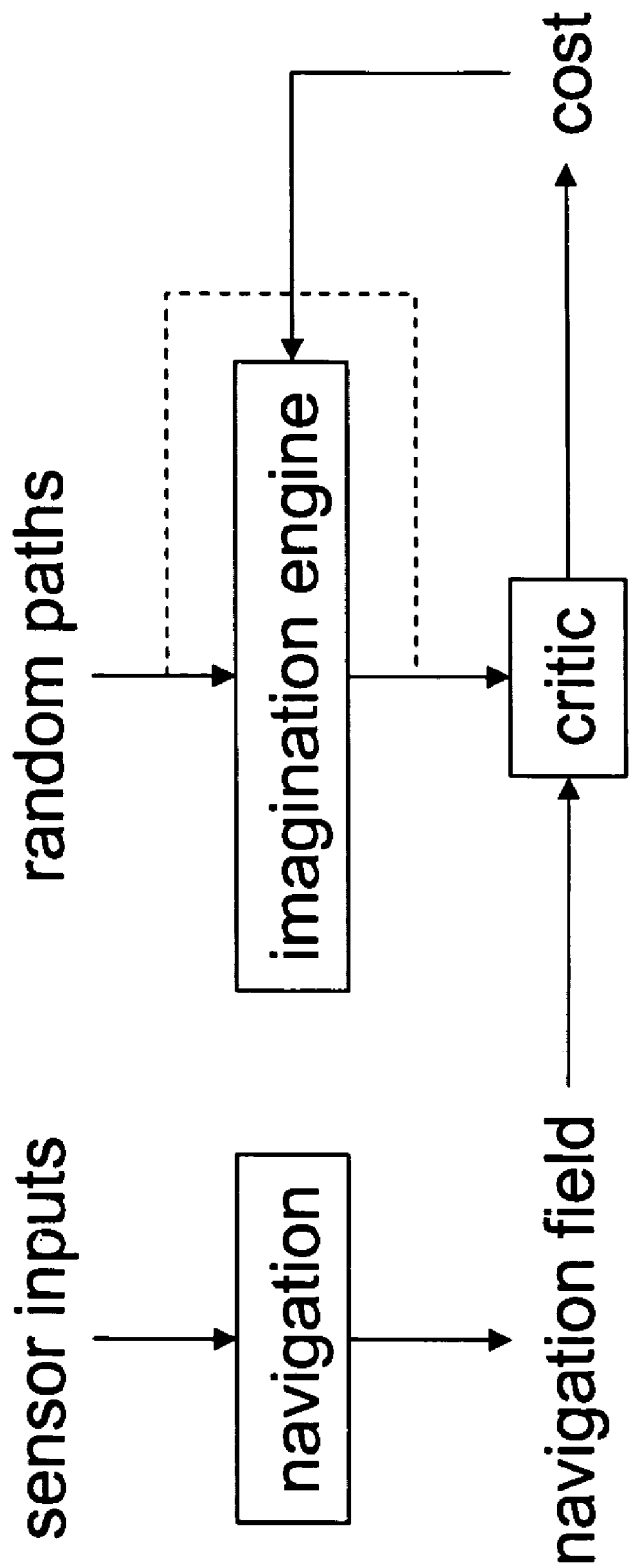
FIGS. 15 and 16 are diagrammatic view of a path planning application of an artificial neural network-based control system.

The above procedure may be generalized for any control or robotic system that is compelled by its objective or environment to autonomously develop complex strategies. The best approach is to allow the system to improvise one fundamental behavior (FIG. 14) and to then degrade the imagination engine's weights, wherein this behavior is embodied, to generate offshoot and potentially valuable strategies. In effect, the weights space solutions for these important derivative behaviors are in the neighborhood of that of the fundamental behavior, and may be quickly discovered through the administration of synaptic perturbations to a network that has already specialized itself to such a fundamental behavior. In a similar fashion important concepts may be developed in such discovery systems through bootstrapping toward a single ideational pattern and subsequently degrading the imagination engine's weights to discover related concepts Robotic Path Planning This application (illustrated in FIGS. 15-17) relates generally to the building of robotic artificial intelligence ("AI") that is deliberative in that it first forms models of the robot's environment and then ponders a number of alternative strategies for achieving some result based upon that model, thereafter implementing an optimal course of action. This approach to robotic AI is in sharp contrast to that of currently practiced, so-called reactive systems whose sensors first detect a scenario within the robot's environment and then enlist appropriate pre-coded behaviors.

If such deliberative AI is implemented in the fundamental neural architecture of a perturbed artificial neural network whose novel output patterns are monitored by a computational critic, the former net is essentially a generator of candidate action plans. The critic algorithm serves as the judge as to which of the emergent patterns is an appropriate course of action. Typically, the critic algorithm requires auxiliary information about its environment to assist in this decision making process.

In the case of robotic path planning, this general scheme may be employed to calculate paths of least resistance toward specific targets or destinations. It takes the general form of FIG. 15, wherein an imagination engine generates potential paths through a terrain as the critic algorithm calculates cost associated with each candidate path so as to arrive at one offering minimal cost. As auxiliary data, some information is needed about the cost associated with each element of the upcoming terrain. To this end, we have used a neural network to map the robot's sensor view of the upcoming terrain to a navigation field, wherein the mobile robot may be thought of as a particle that has entered the field exuded by an object or environment. Local forces exerted by this fictitious field dictate preferred motions of the robot. One usage of such a critic is to calculate either via explicit code and/or another artificial neural network, the line integral of candidate paths through the calculated navigation field.

The self-learning feature of the artificial neural networks involved in this system can come into play through reinforcement learning within the imagination engine of those trajectories promising the lowest cost. After the system has explored several path options, the imagination engine may be interrogated via stochastic excitation to generate the dominant memory resident within it. Furthermore, a critic algorithm that may be numerically calculating a line integral through the navigation field can be simultaneously training a self-learning neural network to perform the same task, using combined inputs of the navigation field and the candidate path emerging from the imagination engine, and having outputs corresponding to the cost calculated with line code. Finally, the imagination engine may likewise be self-learning, starting with some preliminary learning that accelerates the production of viable paths through the environment. Therefore, the imagination engine may be implemented as an auto-associative group membership filter for those trajectories that cross a featureless plane in less than some number of equidistant steps. As a result of such in-situ, pre-training, the imagination engine will preferentially generate trajectories of minimal length. The input of synaptic perturbations at progressively higher levels will tend to degrade the memories stored in this network into more serpentine paths more capable of conforming to the minima in the navigation field landscape and hence delivering lower cost paths.

Figure 16:
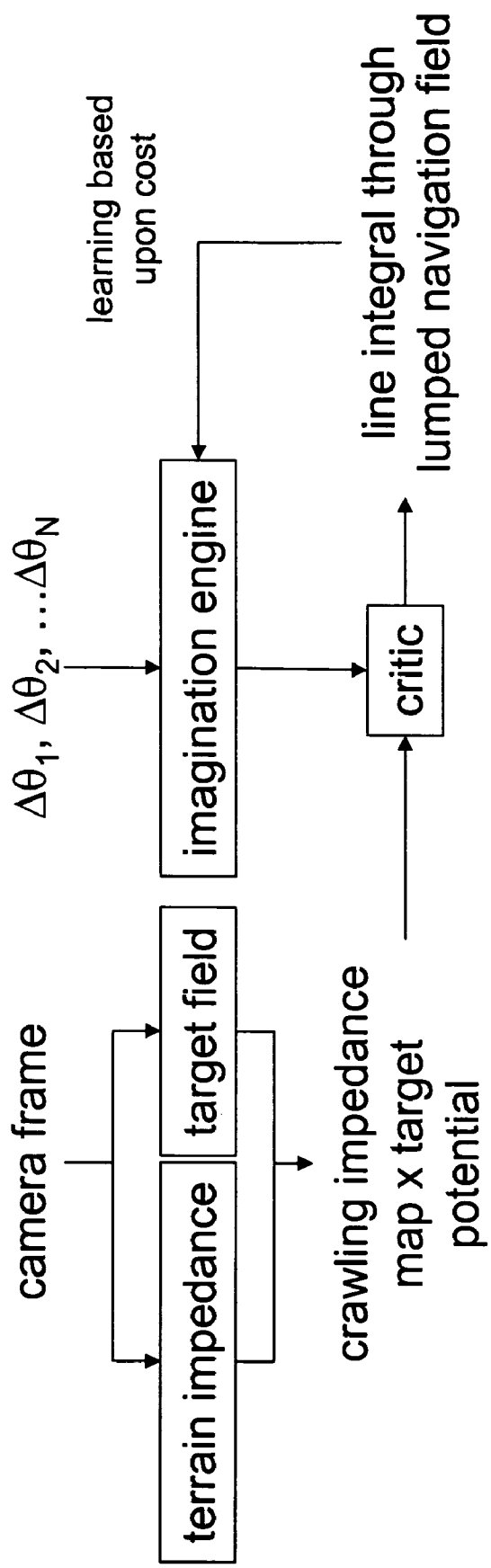

FIG. 16 shows more of the particulars of a deliberative robotic AI system to govern a hexapod crawler equipped with a camera. In this application, a self-learning auto-associative network has been previously shown a series of trajectories through a featureless plane that traverse that area in less than or equal to N segments of equal length, traveling along some azimuth heading θ, along each such step. Therefore, each potential trajectory can be defined by the pattern $(\Delta\theta_1, \Delta\theta_2, \ldots, \Delta\theta_N)$, where each $\Delta\theta_i$ is the change in azimuth in transitioning from one line segment to another. Essentially, through in situ training, this net becomes a group membership filter for those trajectories having minimal total length. The introduction, for instance, of synaptic perturbation to this network, will introduce more variation in the $\Delta\theta_i$ generating more curved and perhaps looped trajectories.

A self-learning neural network was trained in situ to convert the pixels values arriving from an onboard camera to a navigation field. Training exemplars consisted of raw camera views of various terrains and the corresponding two-dimensional arrays, $Z_{terrain}(x,y)$ of locomotive impedance values. Such potentials were laid out by hand, identifying the terrain material at each coordinate, x,y, and associating with each coordinate the measured crawling impedance for a hexapod robot having twelve leg servos. Impedance values for each terrain material were calculated as the reciprocal of the measured top speed of the robot crawling in each material.

Similarly, another self-learning neural network was trained in situ to generate a deep, attractive potential well at the coordinates of a target object. This network was trained by moving the target about a grid and allowing the network to learn to map the raw frames from the camera to the x-y coordinates of the target. The target potential, $Z_{target}(x,y)$ could then be analytically generated as $$Z_{target}(x, y)=1-1/((x-x_0)^2+(y-y_0)^2+\gamma)^{1/2}, \quad (1)$$

where $x_0$ and $y_0$ are the center of mass coordinates of the target, x and y the coordinates of the robot's onboard camera, and γ is a damping constant to avoid a singularity in the field value $Z_{target}$ at the exact location of the target, $x=x_0$, $y=y_0$.

The two navigation fields, $Z_{terrain}$ and $Z_{target}$ were lumped through point by point multiplication of the two field values. These combined fields could later serve as the auxiliary inputs to the critic algorithm calculating cost based upon line integration of the path $(\Delta\theta_1, \Delta\theta_2, \ldots, \Delta\theta_N)$ through it.

Prior to taking its first step along an N segment path, the system shown in FIG. 16 would experiment with a number of candidate paths, reinforcing the memory within the imagination engine in inverse proportion to the cost of its traversal. Prior to movement along a path, the imagination engine was stochastically interrogated to generate its dominant memory, typically that of the lowest cost path through the terrain.

Figure 17B:
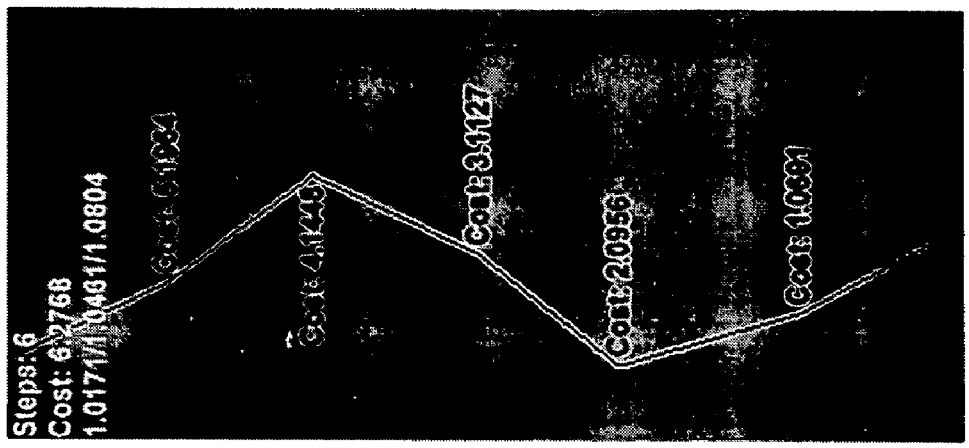
FIG. 17B is a chart showing a cost path or navigation field produced by that application of FIGS. 15 and 16.
Figure 17A:
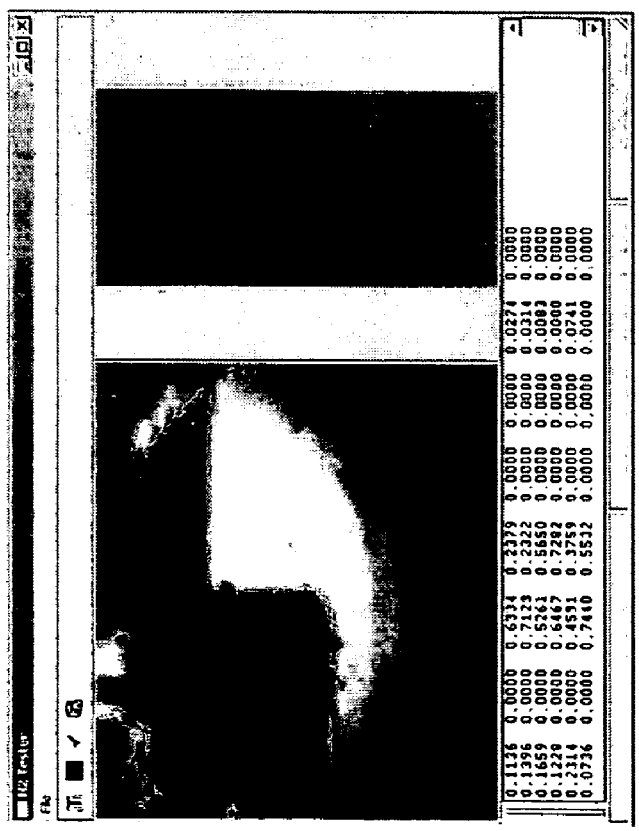
FIG. 17A is a screen shot of a view from a robot incorporating the path planning application of FIGS. 15 and 16.
Figure 18:
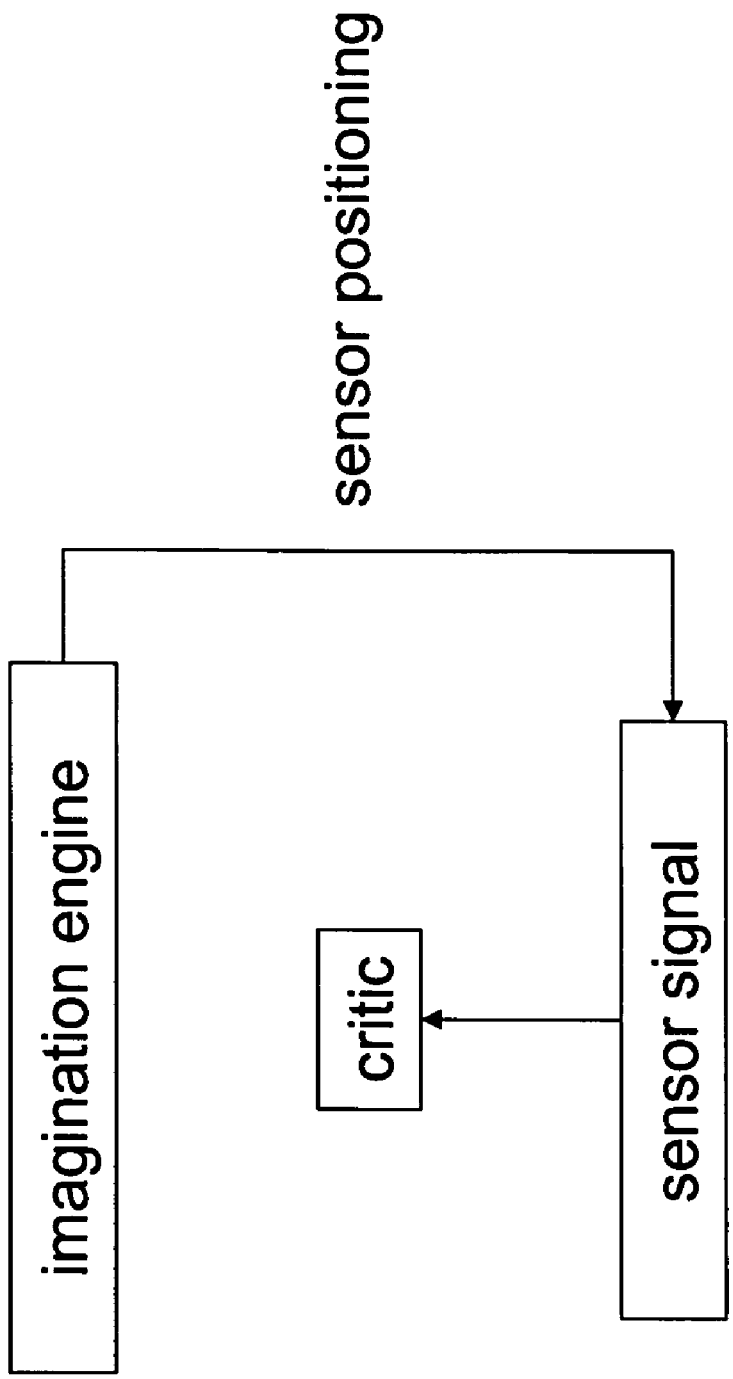
FIGS. 18 and 19 are diagrammatic views of the training of a foveational application of an artificial neural network-based camera control system according to another embodiment.
Figure 19:
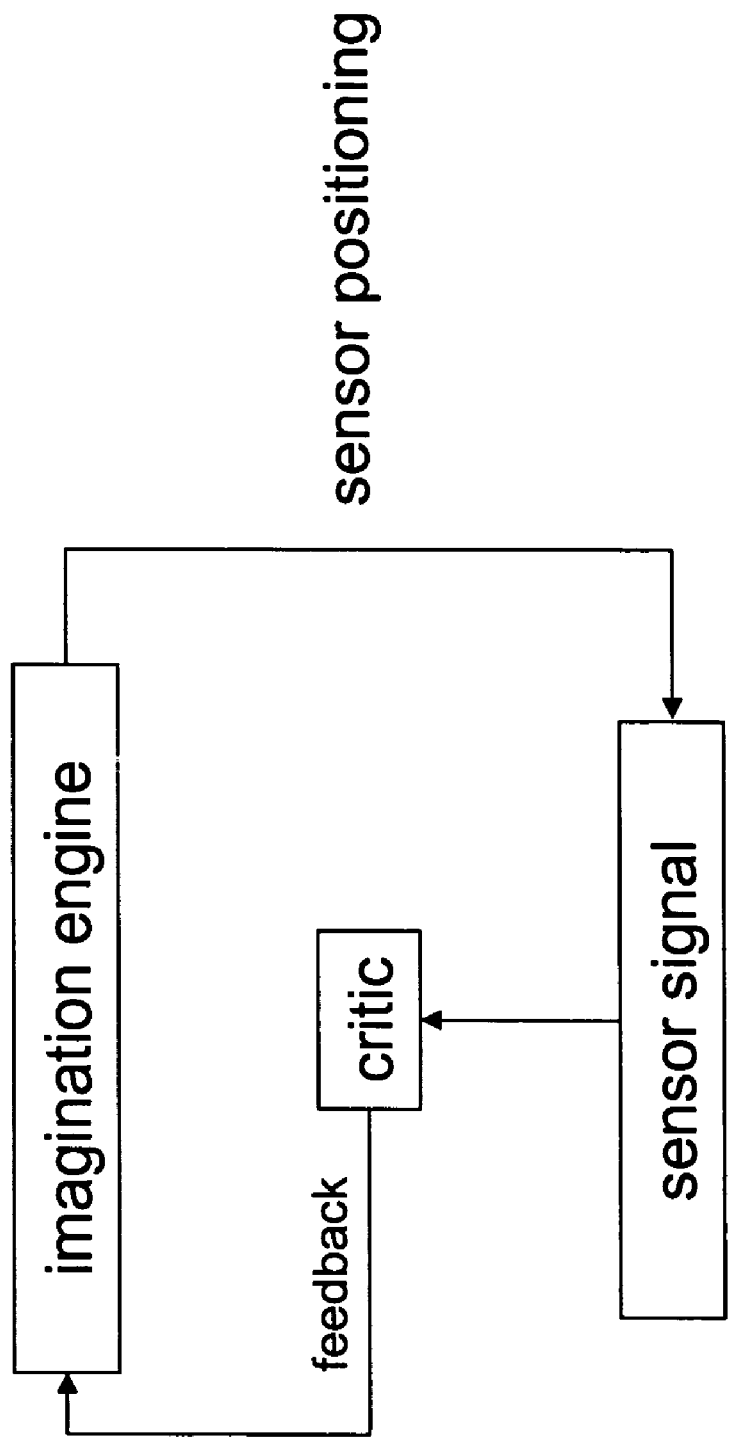

FIG. 17 shows a raw camera frame from the onboard camera and the resulting lumped terrain and target potential to its right. There light grey indicates low impedance within the navigation field and the darker grey indicates high impedance. In the rightmost image, we see a minimal cost route calculated by this system.

Foveational System

This application (illustrated in FIGS. 18-23) generally addresses how to steer directional sensor devices such as cameras so as to detect targets within their environments or to locate specific objects within the larger field of view of such sensors, perhaps over some span of time. Although the description below discusses two degrees of freedom in which the sensor can be focused, higher dimensional schemes can also be achieved as when guiding a six-axis robotic arm to point a sensor at some predetermined target that might be on the move.

This general scheme overcomes the typical shortfall of target recognition systems that rely upon a global classification of an object. Oftentimes placing such an object within a real world environment introduces classification errors due to false target outlines formed by overlap with background features or obscuration of the target by other objects in the foreground. This technique shines over such global classification techniques in that it examines the many parts of an object to cumulative conclude whether it is of the appropriate genre.

The system minimally consists of two neural networks. The first of these, an imagination engine, is a recurrent, auto-associative neural network having two inputs and 2 outputs. These input and output patterns represent the position of an attention window (i.e., the x-y coordinates of its upper left hand corner) used to sample the environment. This network may be pre-trained upon a table of random x-y coordinates. Therefore, to within the training error of the net, application of an arbitrary x-y pair should regenerate the pattern at the net's output layer. If on the other hand, perturbations are transiently administered to the connection weights of this net during feed forward passage, the input pattern will not be faithfully regenerated at the net's outputs. If new, random synaptic perturbations are transiently administered during each recurrent cycle of this net, the attention window, located by these x-y pairs, is randomly and progressively driven through the scene.

Function of this system to locate some pre-designated target typically involves allowing another neural network to analyze the contents of this attention window in order to determine whether it has encountered some portion of the intended target. This latter network's recognition of some portion of the object within the attention window is used to influence the magnitude of the transient perturbations transiently administered to the connection weights of the imagination engine. Some output of this critic is used to control the magnitude of transient perturbations applied to the recurrent imagination engine. The goal of this system is to lower synaptic perturbations in the imagination engine when the attention window is overlapping some portion of the object sought. As a result, the magnitude of the next jump is decreased and cumulatively, the attention window tends to dwell in the neighborhood of the intended target.

If a hetero-associative network is used for this purpose, its output may range from 0 to 1, with 0 representing absolute confidence it has encountered a portion of the sought object. This output value may be used to modulate the transient perturbations within the imagination engine. Alternately, an auto-associative network may serve as the critic, in which case the reconstruction error, δ, which naturally approaches zero as it encounters one of its memories, may be used to directly modulate the synaptic perturbation of the imagination engine.

In the training of this system (FIG. 18) the recurrent imagination engine moves the attention window around a scene until it encounters a portion of the object to be later sought. Encountering such piece of the object, the critic, in the form of a self-learning associative memory, trains upon the contents of the attention window so as to form a memory of that portion of the object. As the attention window wanders over the target object, it cumulatively absorbs memories of the various pieces of that target. Note that this technique may be supplemented with feedback from the critic (FIG. 19) so as to cause the system's attention window to dwell in the vicinity of the object even during the training phase.

Figure 20:
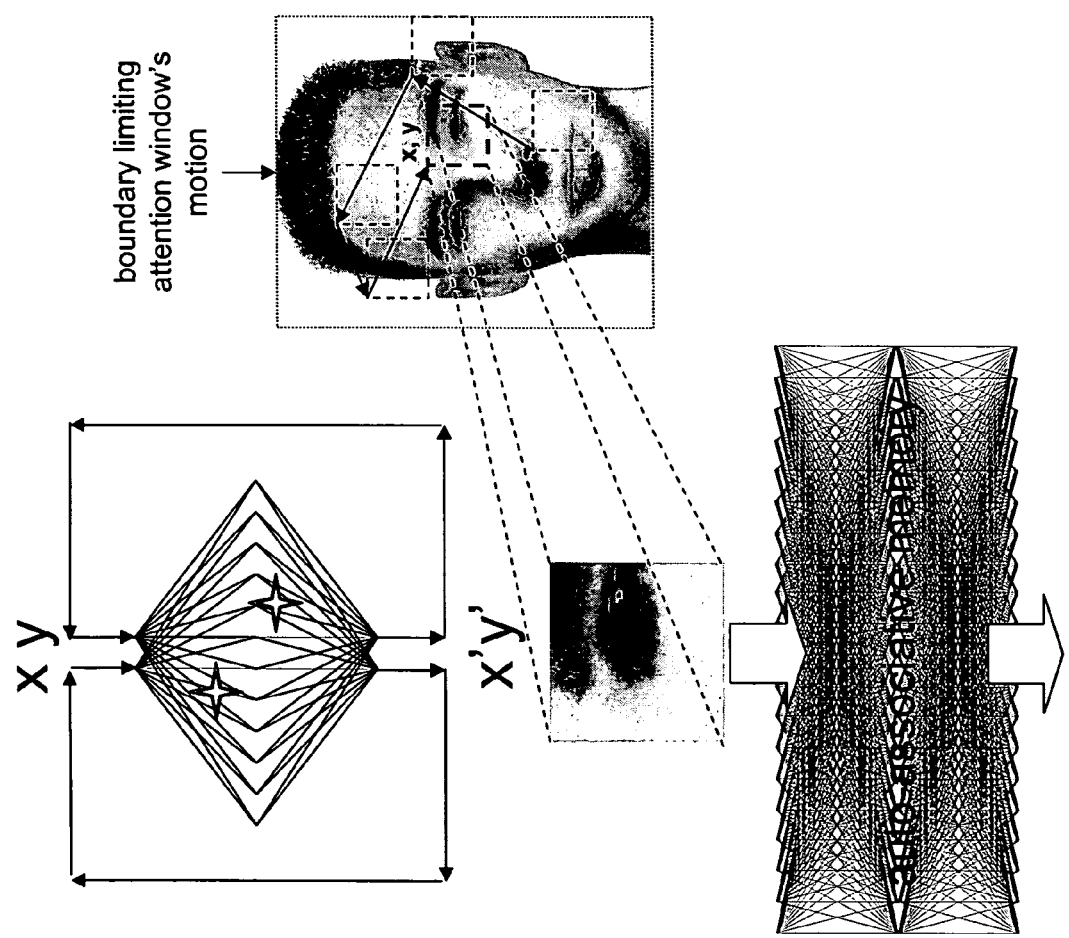
FIG. 20 is a schematic depiction of the application of FIGS. 18 and 19.
Figure 21:
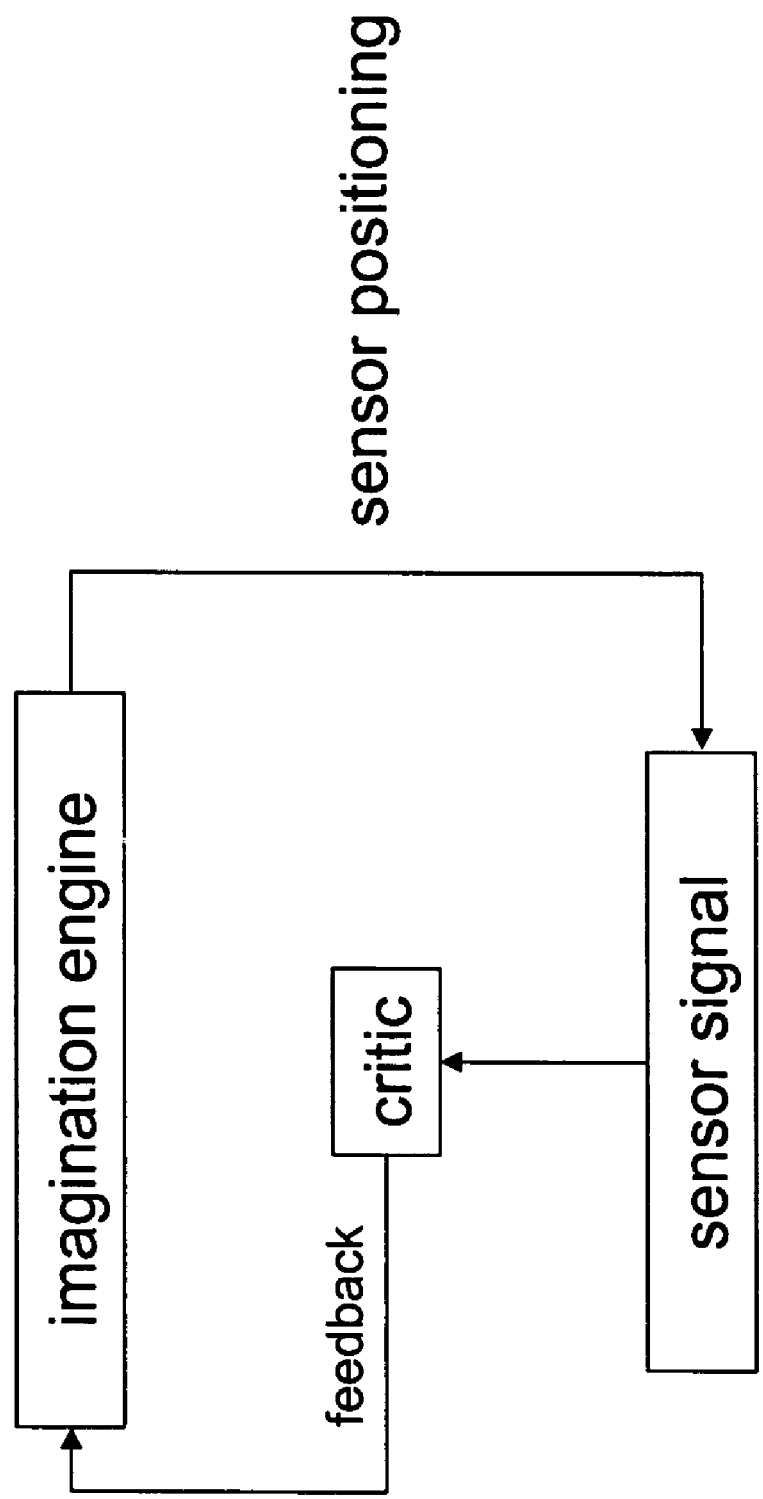
FIG. 21 is a diagrammatic view of the operation of the application of FIGS. 18-20.

More particulars are depicted in FIG. 20, wherein the target is a face within a camera frame. In the training phase, the target is physically or programmatically masked from its environment. Likewise, physical or programmatic constraints are implemented to prevent the attention window from sampling other than the intended target. Perturbations within the imagination engine drive the attention window over the target, as the auto-associative critic now trains upon each corresponding sample of the target. The attention window roves over the target until the critic has learned sufficient portions of the target for later identification.

In use (FIG. 21), synaptic perturbations within the imagination engine move the attention window through the scene. The critic, that is fed the contents of the attention window, determines whether such content is a portion of the object sought. The more such contents resemble a piece of the target sought, the more the transient synaptic perturbations are modulated toward zero intensity, increasing the overall itinerancy of the attention window in the neighborhood of the object. As an optional step, the imagination engine, now self-learning, can reinforce the memories of such positions when the critic detects a portion of the target. Subsequently, either the center of gravity of itinerancy of the attention window may be used to locate the overall target, or if reinforcement learning has been implemented in the imagination engine, it may be interrogated for its dominant memory, using stochastic inputs to find input patterns yielding minimal reconstruction error, δ, or through recursion of a stochastic input seed until such reconstruction error approaches a minimum.

Figure 22:
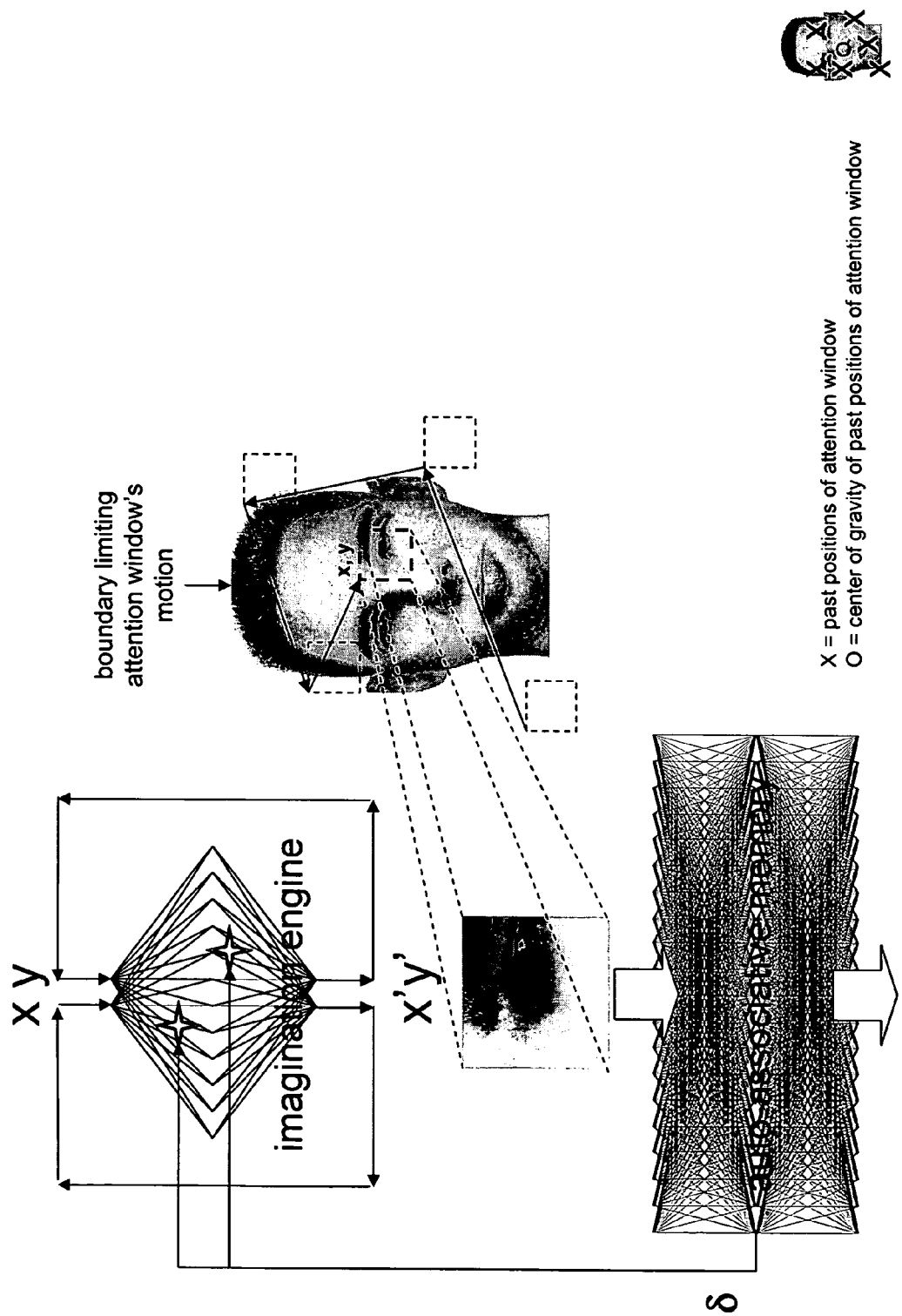
FIGS. 22 and 23 are schematic depictions of the operation of the application of FIGS. 18-21.
Figure 23:
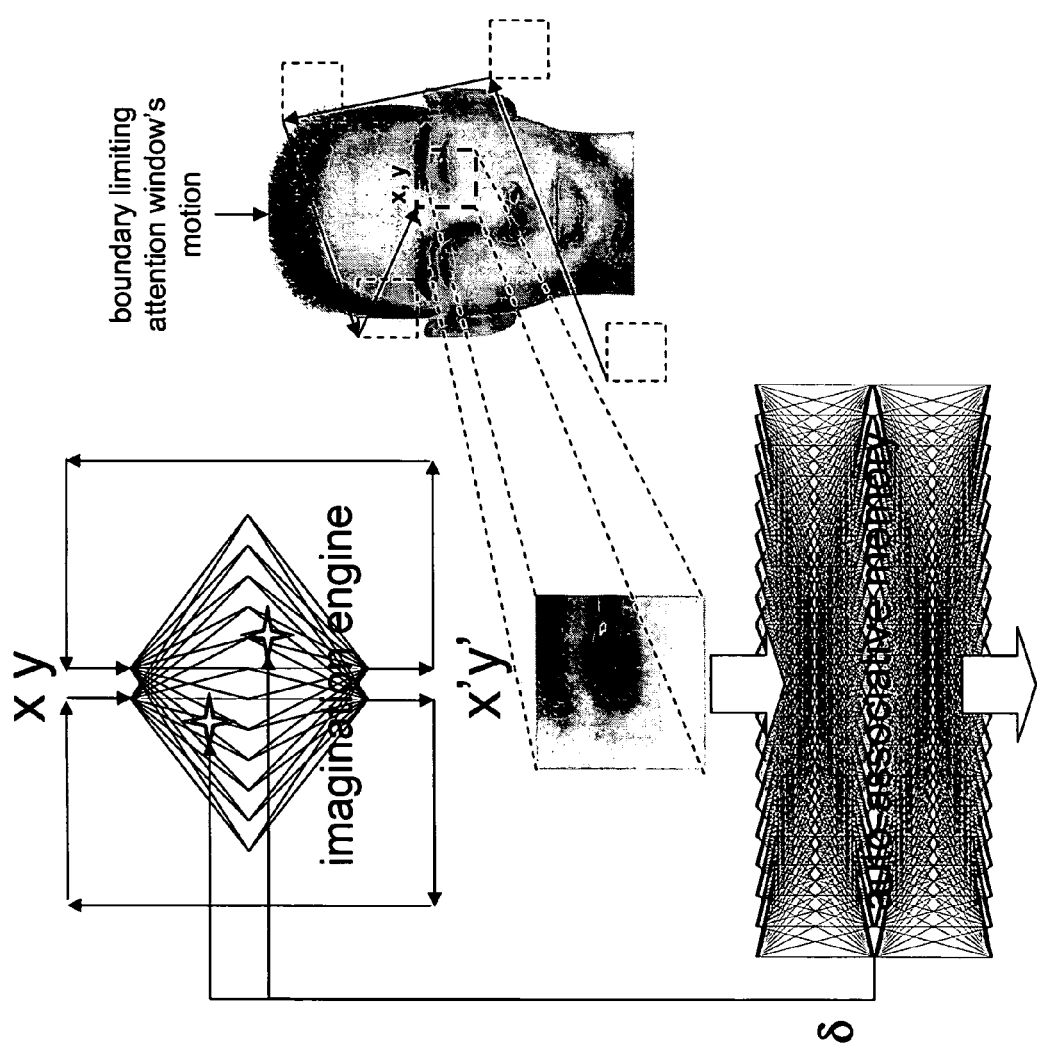

FIGS. 22 and 23 illustrate particulars of this process in the context of locating a face within either still images from a camera or successive frames thereof. In this approach, an auto-associative memory is used as the critic that outputs a reconstruction error, δ, in response to the contents of the attention window that is being driven across the scene by the imagination engine. This reconstruction error in turn modulates the intensity of transient perturbations to the imagination engine, causing the attention window to be largely itinerant in the vicinity of the target face. Essentially, the center of gravity of locations the attention window has visited denotes the location of the target within the scene. FIG. 23 also illustrates the use of reinforcement learning in the imagination engine so as to make the dominant memory in that network, the location of the target. The reinforcement learning is triggered by the magnitude of the reconstruction error, δ.

It will be obvious to those skilled the art that the present invention can be used for many purposes and applications other than the non-limiting examples described herein. Furthermore, those of skill in the art will recognize that the systems described herein may be implemented through software simulated neural networks or hardware-based network structures.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

I claim:

1. A self-learning, artificial neural network based-discovery device, comprising:
    a first self-learning artificial neural network capable of generating patterns when perturbed;
    means for subjecting said first self-learning artificial neural network to varying degrees of perturbation;
    a second self-learning artificial neural network associated with said first self-learning artificial neural network so as to receive said generated patterns therefrom;

means for implementing said generated patterns of said first self-learning artificial neural network as a concept;

means of evaluating an effect of said concept;

means of triggering reinforcement learning within said first self-training artificial neural network upon any of said generated patterns leading to a positive effect;

means of triggering reinforcement learning in said second self-learning artificial neural network so as to incorporate within said second network a relationship between at least one of said generated patterns of said first self-learning artificial neural network and said effect of said generated pattern.

2. The self-learning artificial neural network based-discovery device of claim 1, further comprising means for controlling the perturbations within said first artificial neural network on the basis of output patterns from said second artificial neural network.

3. The self-learning artificial neural network based-discovery device of claim 1, further comprising means of detraining at least one of said first and second self-learning artificial neural networks if said means of evaluating an effect of said concept indicates a negative effect.

4. The self-learning, artificial neural network-based discovery device of claim 1, wherein said second artificial neural network is operable to compare said input patterns and said generated patterns of said first self-learning artificial neural network.

5. The self-learning, artificial neural network-based discovery device of claim 1, wherein said second artificial neural network is a hetero-associative artificial neural network.

6. A self-learning, artificial neural network based-discovery device, comprising:

a first artificial neural network portion capable of generating patterns;

means for subjecting said first artificial neural network to varying degrees of perturbation;

means for implementing at least one of said generated patterns of said first self-learning artificial neural network as a concept;

means of evaluating an effect of said concept;

means of triggering reinforcement learning within said first self-training artificial neural network of one of said generated patterns leading to a positive effect.

7. The self-learning artificial neural network based-discovery device of claim 6, further comprising means of detraining said first self-learning artificial neural networks if said means of evaluating an effect of said concept indicates a negative effect.

8. The self-learning, artificial neural network-based discovery device of claim 6, wherein said means for evaluating said concept comprises human evaluation of said generated patterns of said first artificial neural network.

9. The self-learning, artificial neural network-based discovery device of claim 6, wherein said means for evaluating said concept comprises at least one sensor.

10. The self-learning, artificial neural network-based discovery device of claim 9, wherein said sensor is a sonar device.

11. The self-learning, artificial neural network-based discovery device of claim 9, wherein said sensor is a camera.

12. The self-learning, artificial neural network-based discovery device of claim 6, wherein said means of evaluating said effect of said concept is governed by an at least partially random process.

13. The self-learning, artificial neural network-based discovery device of claim 6, wherein said means of evaluating said effect of said concept is governed by one of the group consisting of a rule-based algorithm and a model-based algorithm.

14. The self-learning, artificial neural network-based discovery device of claim 13, wherein said algorithm is operable to compare said input patterns and said generated patterns of said first artificial neural network.

15. The self-learning, artificial neural network-based discovery device of claim 6, further comprising at least a second self-learning artificial neural network associated with the first artificial neural network so as to receive generated patterns from said first network;

means of triggering reinforcement learning in said second self-learning artificial neural network so as to incorporate within said second network a relationship between at least one of said generated patterns of said first self-learning artificial neural network and said effect of said generated pattern.

16. The self-learning, artificial neural network-based discovery device of claim 6, further comprising at least one rule-based algorithm associated with said first artificial neural network so as to receive said generated patterns from said first artificial neural network.

17. The self-learning, artificial neural network-based discovery device of claim 6, wherein said means of evaluating said effect of said concept is a function of at least one objective criterion.

18. The self-learning, artificial neural network-based discovery device of claim 6, wherein said means of evaluating said effect of said concept is a function of at least one subjective criterion.

19. The self-learning, artificial neural network-based discovery device of claim 6, wherein said device is incorporated in a robotic mechanism.

20. The self-learning, artificial neural network-based discovery device of claim 6, wherein said device is incorporated in a virtual robotic system.

21. The self-learning, artificial neural network-based discovery device of claim 6, wherein said device is incorporated in a simulated robotic system.

22. The self-learning, artificial neural network-based discovery device of claim 6, wherein said device is incorporated in a machine vision system.

23. The self-learning, artificial neural network-based discovery device of claim 6, wherein said first artificial neural network is an auto-associative artificial neural network.

24. The self-learning, artificial neural network-based discovery device of claim 23, wherein said first artificial neural network is operable as a group membership filter.

25. A self-learning, artificial neural network based-discovery device, comprising:

an array of self-learning artificial neural networks, each of said artificial neural networks capable of generating patterns in response to varying degrees of perturbation to it;

means for subjecting at least one of said self-learning artificial neural networks to varying degrees of perturbation;

wherein at least a first, perturbed, self-learning artificial neural network is associated with at least a second of said self-learning artificial neural networks such that said second of said self-learning artificial neural networks receives generated patterns from said first perturbed artificial neural network;

means for implementing said generated patterns of at least said first perturbed self-learning artificial neural network as a concept;

means of evaluating an effect of said concept;

means of triggering reinforcement learning within at least said first perturbed, self-training artificial neural networks upon said generated patterns leading to a positive effect;

means of triggering reinforcement learning in at least said second self-learning artificial neural network so as to incorporate within said second network a relationship between at least one of said generated patterns of said first, perturbed, self-learning artificial neural network and said effect of said generated pattern.

26. The self-learning, artificial neural network-based discovery device of claim 25, wherein said generated pattern is a combination of patterns generated by said first perturbed artificial network and at least a second, perturbed, self-learning artificial neural network.

27. A self-learning, artificial neural network-based discovery device, specific to path planning, comprising:

a first self-learning artificial neural network capable of producing generated patterns in response to perturbations applied to said first network and wherein said generated patterns represent potential paths through an environment;

means for subjecting said first self-learning artificial neural network to varying degrees of perturbation;

means for calculating a cost associated with said potential paths;

means for providing environmental inputs to said means for calculating a cost, wherein said means for calculating uses said environmental inputs to generate said cost; and wherein said means for calculating a cost determines a minimal cost path through said environment from said potential paths generated by said perturbed first neural network.

28. The self-learning, artificial neural network-based discovery device of claim 27, wherein said means for calculating comprises a second artificial neural network.

29. The self-learning, artificial neural network-based discovery device of claim 27, wherein said means for calculating comprises a rule-based algorithm.

30. The self-learning, artificial neural network-based discovery device of claim 27, wherein said paths having a low cost are reabsorbed within said first self-training artificial neural network by successive training.

31. The self-learning, artificial neural network-based discovery device of claim 27, further comprising means of triggering reinforcement learning within said first self-training artificial neural network of one of said potential paths based upon said cost of said potential path.

32. The self-learning, artificial neural network-based discovery device of claim 27, wherein magnitudes of said perturbations are based on said cost.

33. The self-learning, artificial neural network-based device of claim 27, wherein said environmental inputs comprise identification of low and high motion impedance areas and wherein said means for calculating is further operative to calculate a navigation field comprising a map of said low and high motion impedance areas.

34. The self-learning, artificial neural network-based device of claim 27, wherein said first self-learning artificial neural network is interrogated via various degrees of perturbation to generate its dominant memories, representing least cost paths through the environment.

35. The self-learning artificial neural network based device of claim 27, wherein said first self-learning artificial neural network comprises a group membership filter.

36. An artificial neural network-based discovery device, comprising:

a first artificial neural network capable of generating patterns in response to perturbations applied to said first network and wherein said generated patterns represent potential plans of action;

means for subjecting said first artificial neural network to varying degrees of perturbation;

means for calculating a cost associated with said potential plans of action;

means for providing environmental inputs to said means for calculating a cost, wherein said means for calculating uses said environmental inputs to generate said cost; and wherein said means for calculating a cost determines a minimal cost plan of action from said potential plans of action generated by said perturbed first neural network.

37. The artificial neural network-based device of claim 36, wherein said means for calculating is further operative to calculate a navigation field based on said costs of said potential plans of action.

38. The artificial neural network-based device of claim 36, wherein said first artificial neural network is a self-learning, artificial neural network.

39. A self-learning, artificial neural network-based discovery device, comprising:

a first, self-learning artificial neural network capable of generating patterns in response to perturbations applied to said first network;

means for subjecting said first self-learning artificial neural network to varying degrees of perturbation;

means of determining a value of said generated patterns; and means of triggering reinforcement learning within said first self-training artificial neural network of at least one of said generated patterns having a desired value.

40. The self-learning, artificial neural network-based discovery device of claim 39, further comprising means for interrogating said first artificial neural network through the application of perturbations so as to reconstruct memories of said generated patterns after at least one cycle of reinforcement learning within said first artificial neural network.

41. The self-learning, artificial neural network-based discovery device of claim 39, further comprising means for subjecting said first self-learning artificial neural network to varying degrees of perturbation to produce degraded memories of said generated patterns after at least one cycle of reinforcement learning within the first artificial neural network.

42. The self-learning, artificial neural network-based discovery device of claim 41, wherein said degraded memories represent derivative concepts from previously absorbed concepts through at least one cycle of reinforcement learning.

43. The self-learning, artificial neural network-based discovery device of claim 39, wherein said means for evaluating comprises a second artificial neural network so as to receive said generated patterns from said first artificial neural network.

44. The self-learning, artificial neural network-based discovery device of claim 39, wherein said means for evaluating comprises a rule-based algorithm.

45. A self-learning, artificial neural network-based device for object detection, comprising:

means for providing sensor perspectives of an environment;

means to move an attention window, wherein each position of said attention window represents at least one of said sensor perspectives of said environment; and a first self-learning artificial neural network whose input patterns consist of content of said sensor perspectives and operative to generate a recognition metric indicating recognition of said content of said sensor perspectives.

46. The self-learning, artificial neural network device of claim 45, wherein said first self-learning artificial neural network learns the contents of the attention window only when the attention window encounters a portion of a to-be-sought object.

47. The self-learning, artificial neural network device of claim 46, wherein said object is distinguished from a surrounding environment by deliberately making said surrounding environment neutral.

48. The self-learning, artificial neural network device of claim 46, wherein said object is distinguished from a surrounding environment by masking said object from said surrounding environment.

49. The self-learning, artificial neural network device of claim 45, wherein said means to move an attention window comprises a second, self-learning, auto-associative, artificial, neural network operable to run recurrently with varying degrees of perturbation; and
further comprising means for adjusting perturbations to said second artificial neural network based upon said recognition metric generated by said first artificial neural network.

50. The self-learning, artificial neural network device of claim 49, wherein reinforcement learning takes place in said second artificial neural network when said first network identifies at least a portion of said content of said sensor perspectives, said reinforcement learning relating to a position of said sensor perspective associated with said identified portion of said content.

51. The self-learning, artificial neural network device of claim 50, wherein perturbations are used to interrogate said second network for a dominant memory of said second network after said reinforcement learning has occurred.

52. The self-learning, artificial neural network device of claim 45, wherein said means to move said attention window comprises one of the group consisting of a raster algorithm and a linear scanning algorithm.

53. An artificial neural network-based device, comprising:
a first, auto-associative, artificial neural network trained upon patterns having the commonality of belonging to a particular group or genre;
a comparator portion, said comparator portion being operative to compare patterns supplied to said first network with patterns generated by said first network in order to produce a reconstruction error associated with said first artificial neural network; and
wherein said reconstruction error represents a recognition metric of patterns belonging to said group or genre.

54. An artificial neural-network based navigational field generation system, comprising:
a first artificial neural network;
means for providing environmental sensor inputs to said first artificial neural network; and
wherein said first network is operative to generate a navigational field comprising field values at coordinates within said environment.

* * * * *